Jan. 7, 1930.   F. L. FULLER   1,742,701
KEY OPERATED CASH REGISTER
Filed Nov. 19, 1918   24 Sheets-Sheet 2
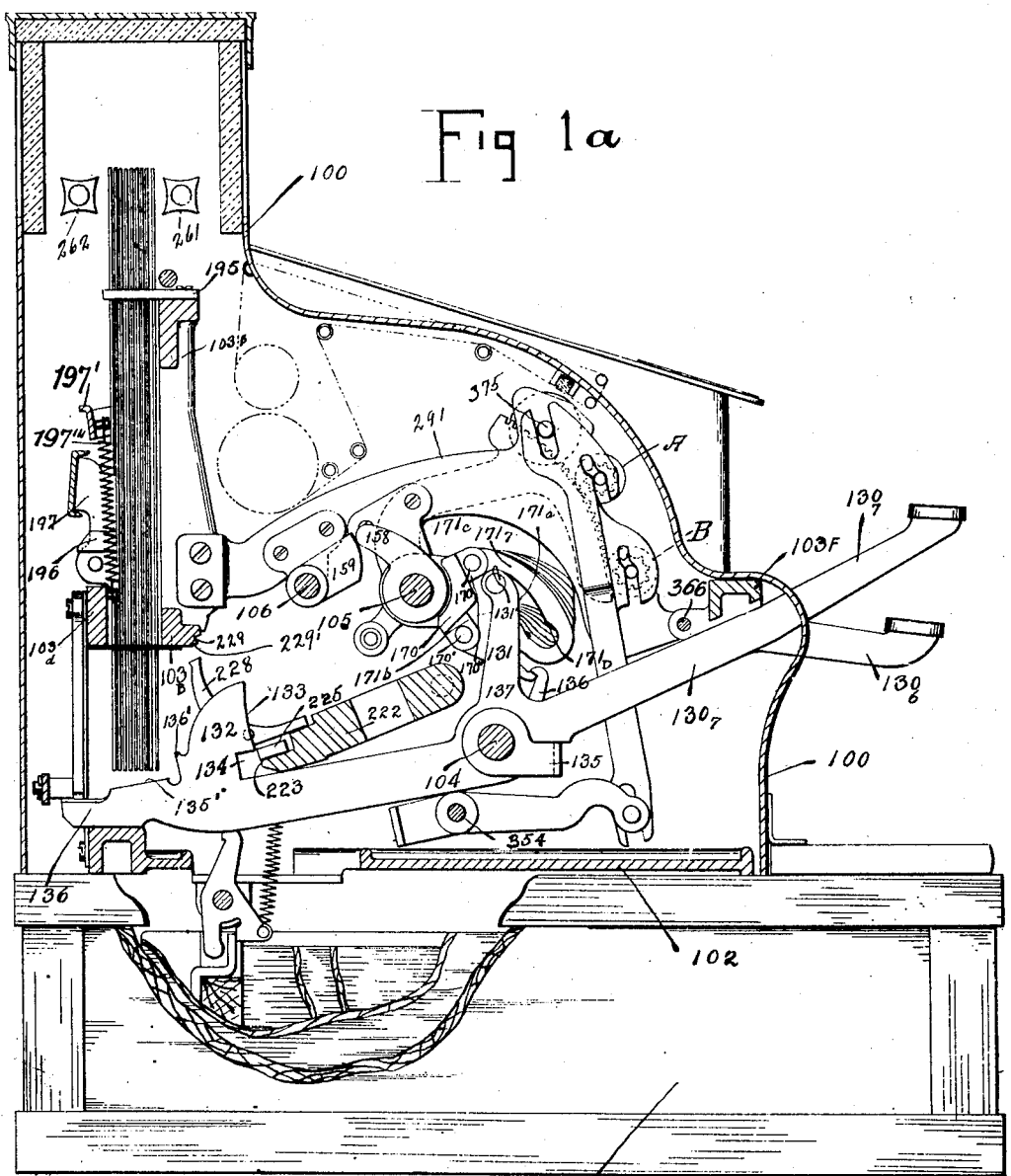
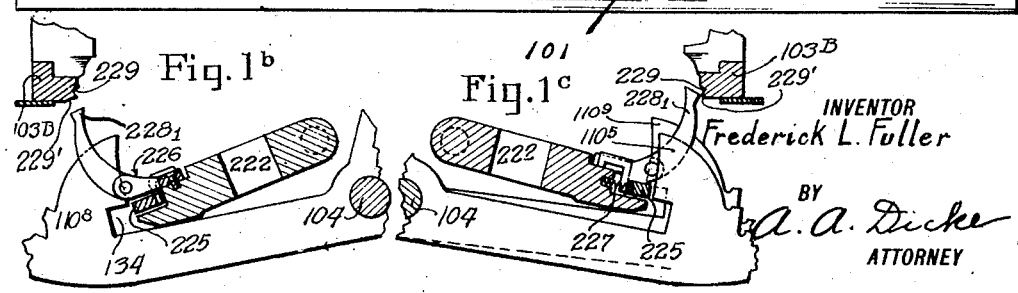
INVENTOR
Frederick L. Fuller
BY
A. A. Dicke
ATTORNEY

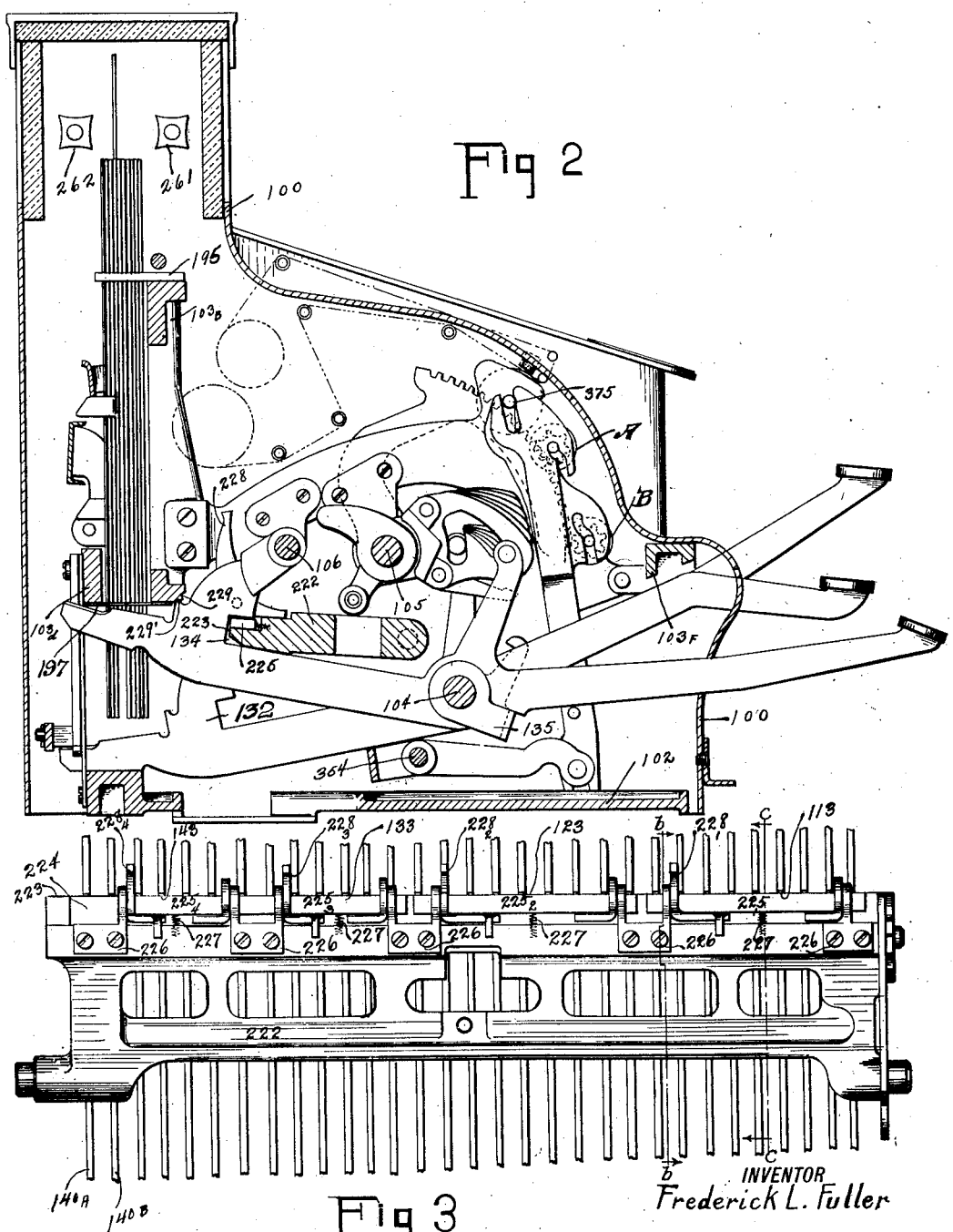

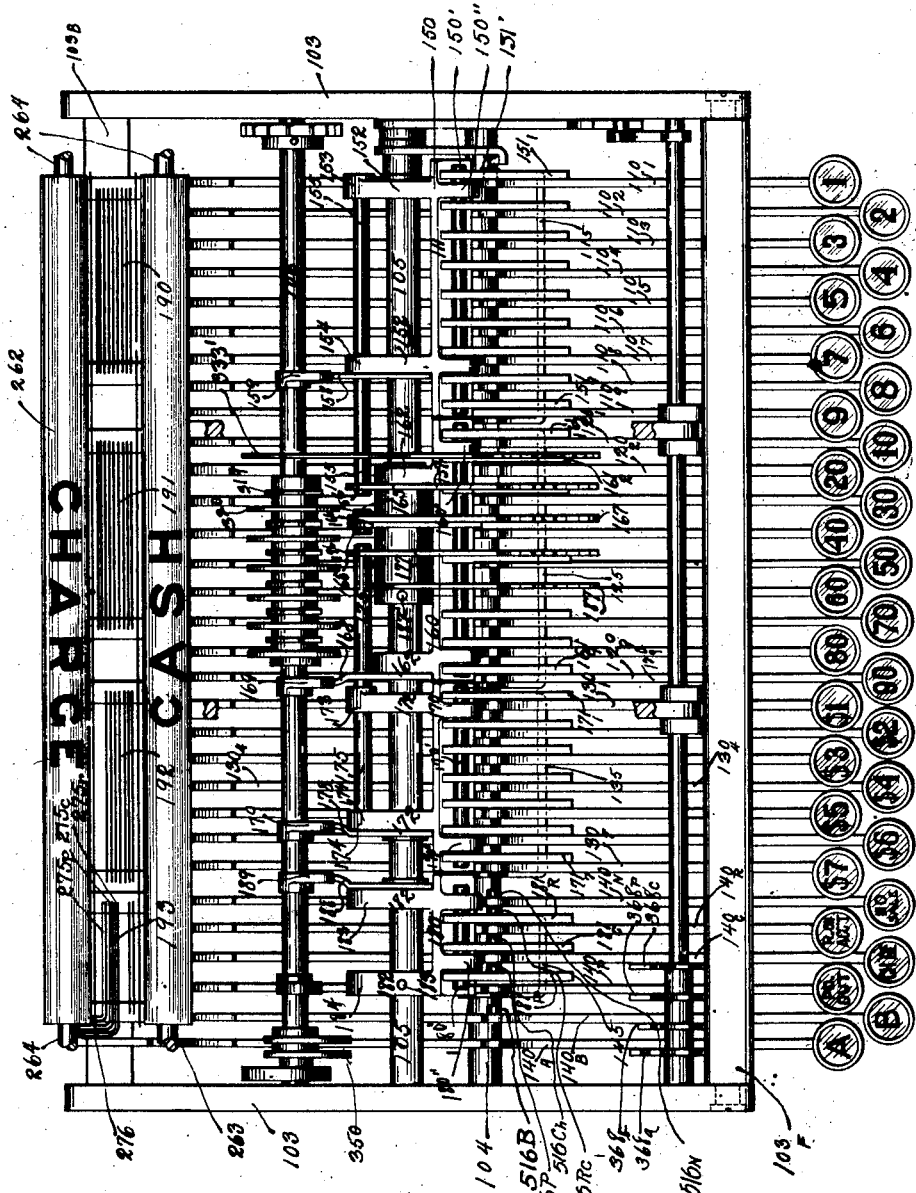

Jan. 7, 1930.　　　　　F. L. FULLER　　　　　1,742,701
KEY OPERATED CASH REGISTER
Filed Nov. 19, 1918　　　24 Sheets-Sheet 5

INVENTOR
Frederick L. Fuller
BY
A. A. Dicke
ATTORNEY

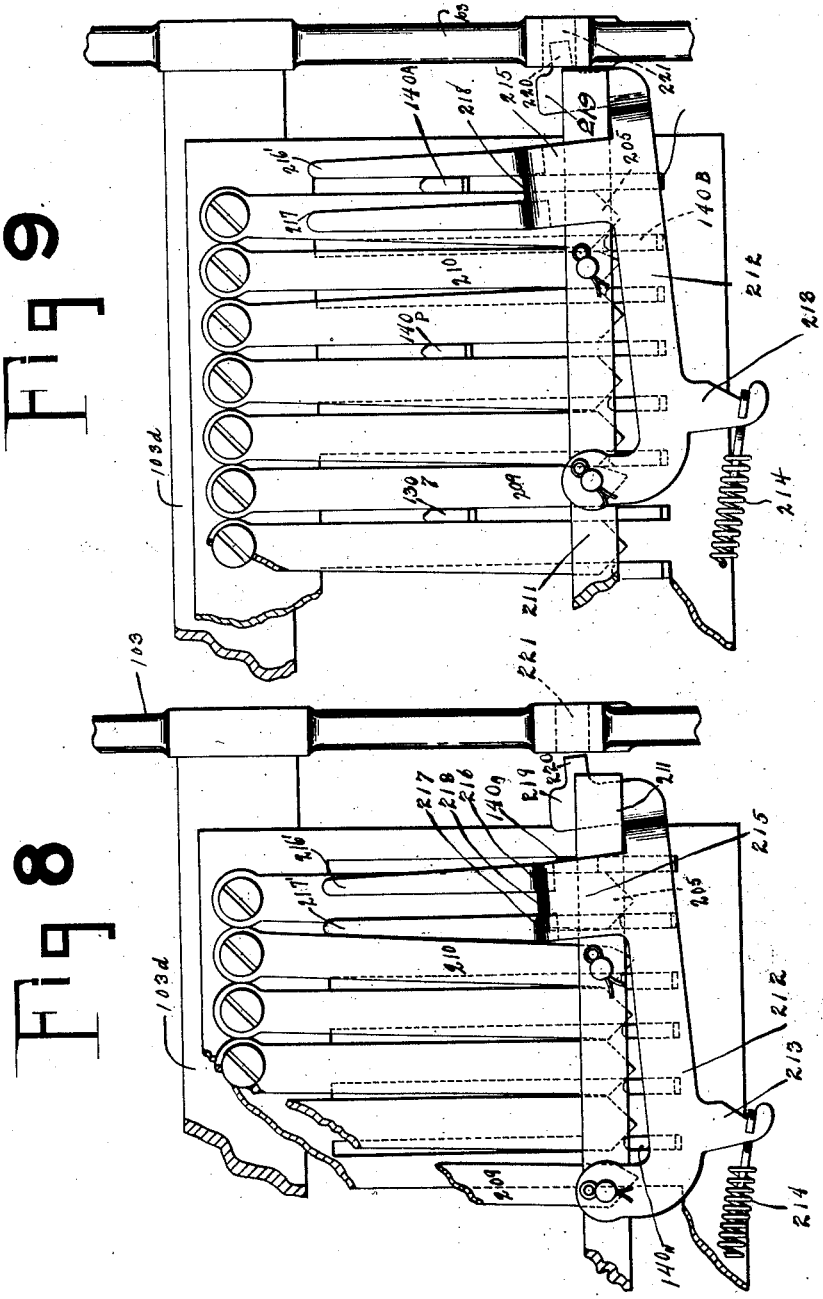

Jan. 7, 1930.  F. L. FULLER  1,742,701
KEY OPERATED CASH REGISTER
Filed Nov. 19, 1918   24 Sheets-Sheet 8
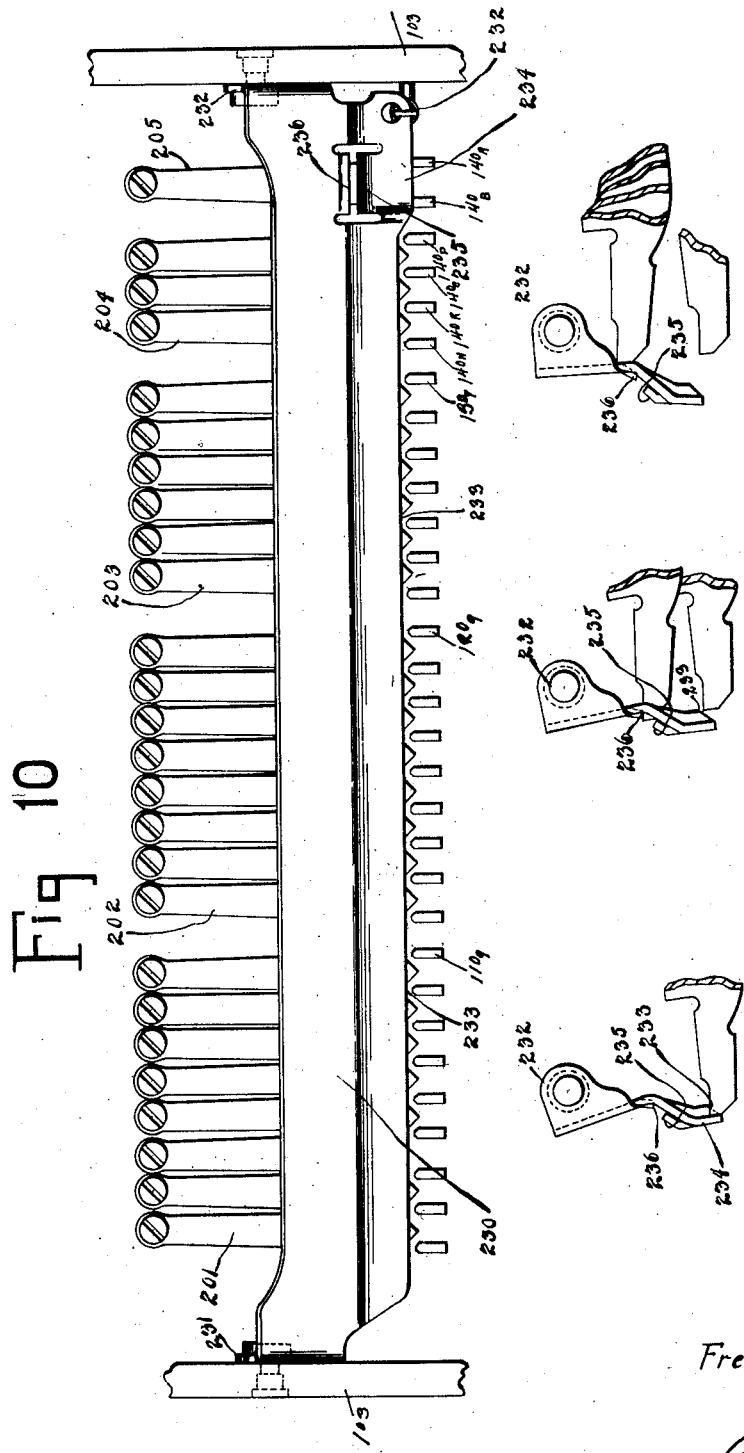
INVENTOR
Frederick L. Fuller
BY
a. a. Dicke
ATTORNEY Jan. 7, 1930.  F. L. FULLER  1,742,701
KEY OPERATED CASH REGISTER
Filed Nov. 19, 1918   24 Sheets-Sheet 9
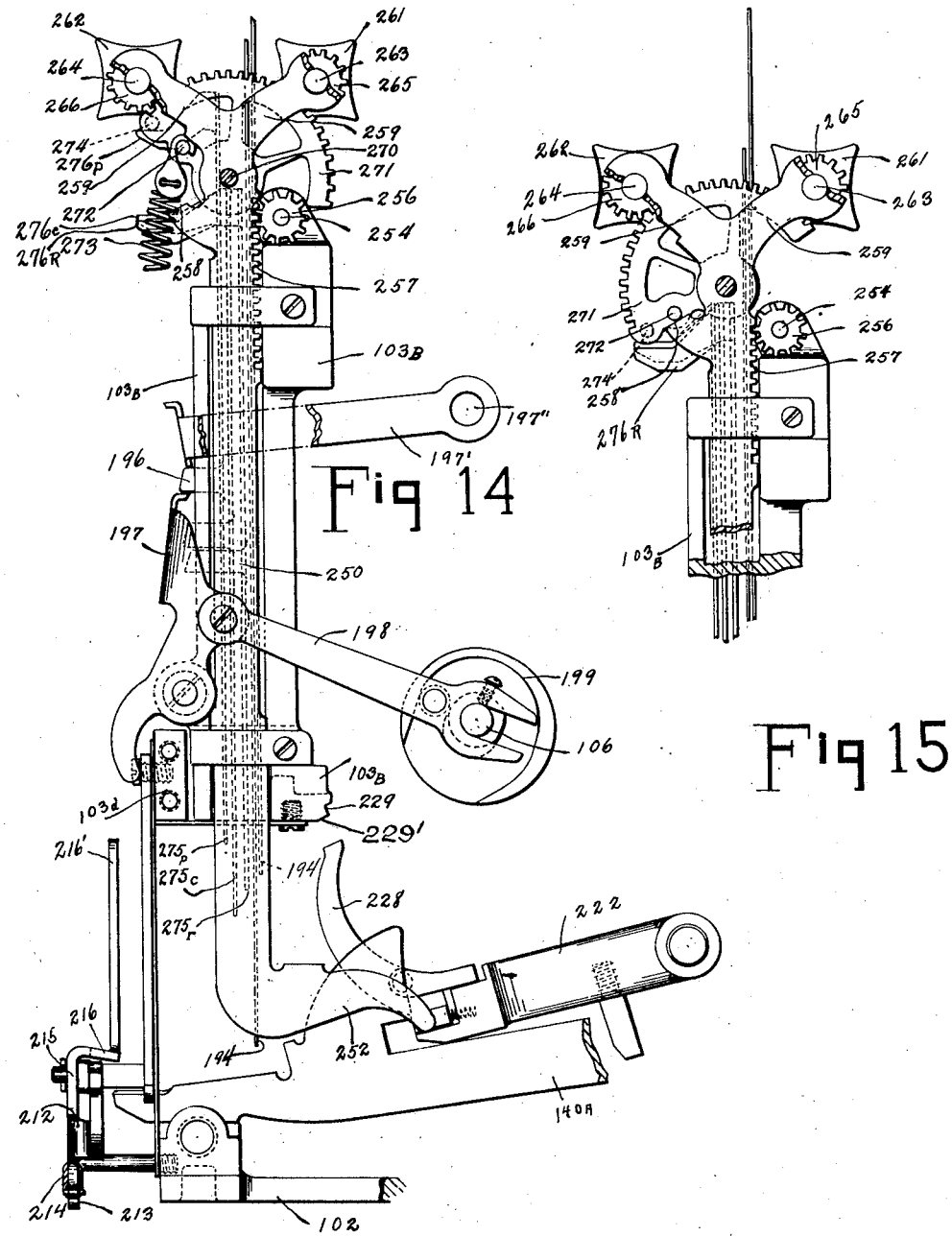
INVENTOR
Frederick L. Fuller
BY
A. A. Dicke
ATTORNEY Jan. 7, 1930.  F. L. FULLER  1,742,701
KEY OPERATED CASH REGISTER
Filed Nov. 19, 1918  24 Sheets-Sheet 10
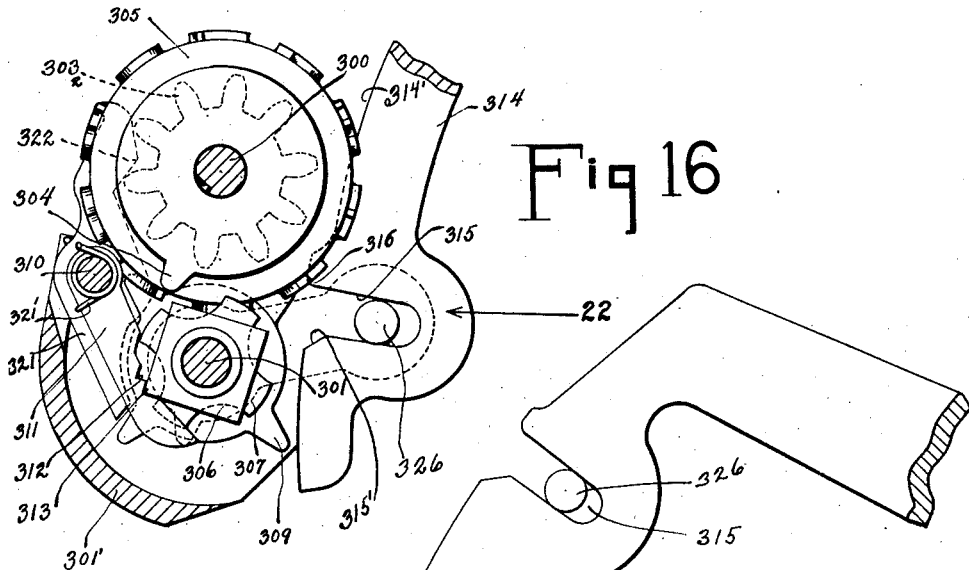
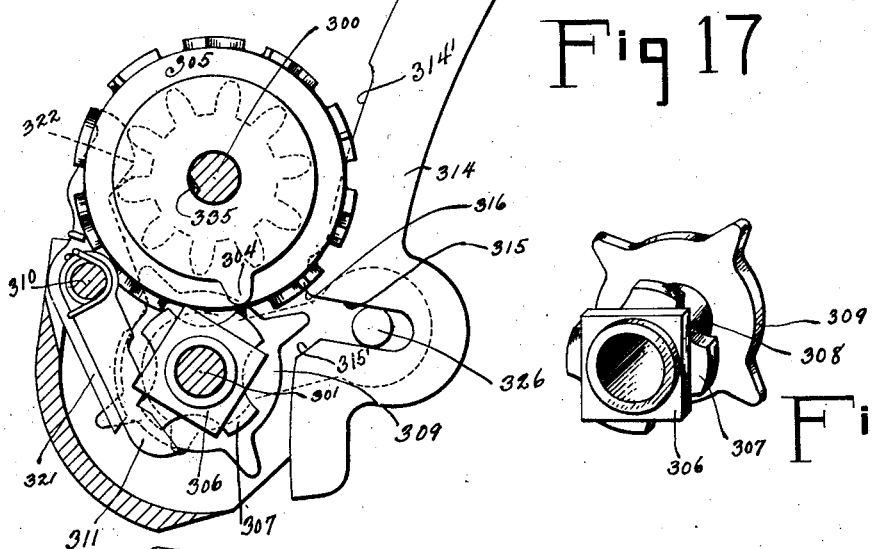
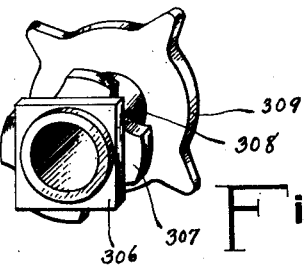
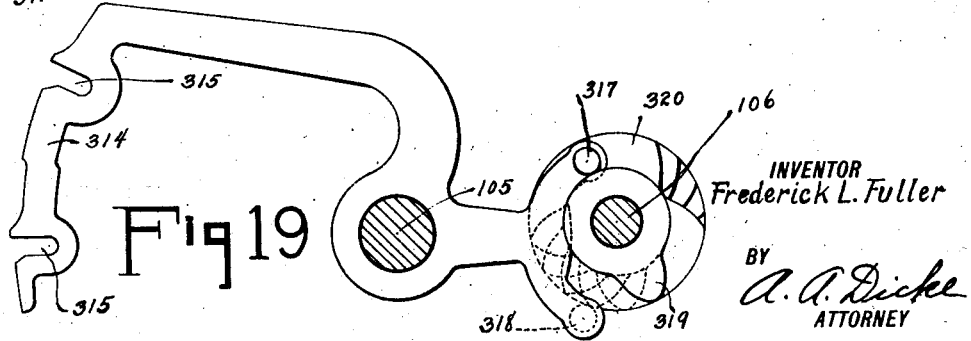
INVENTOR
Frederick L. Fuller
BY
A. A. Dicke
ATTORNEY Jan. 7, 1930.  F. L. FULLER  1,742,701
KEY OPERATED CASH REGISTER
Filed Nov. 19, 1918   24 Sheets-Sheet 11
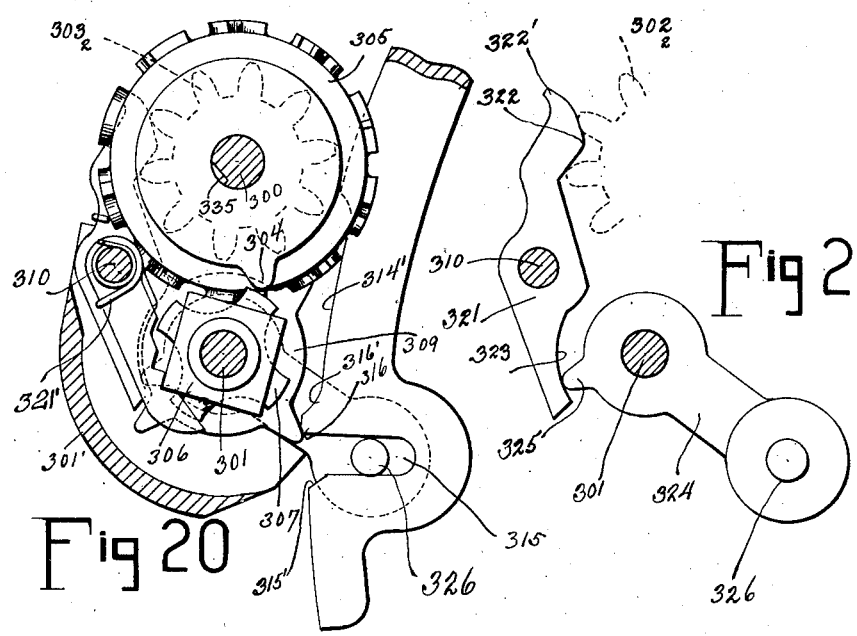
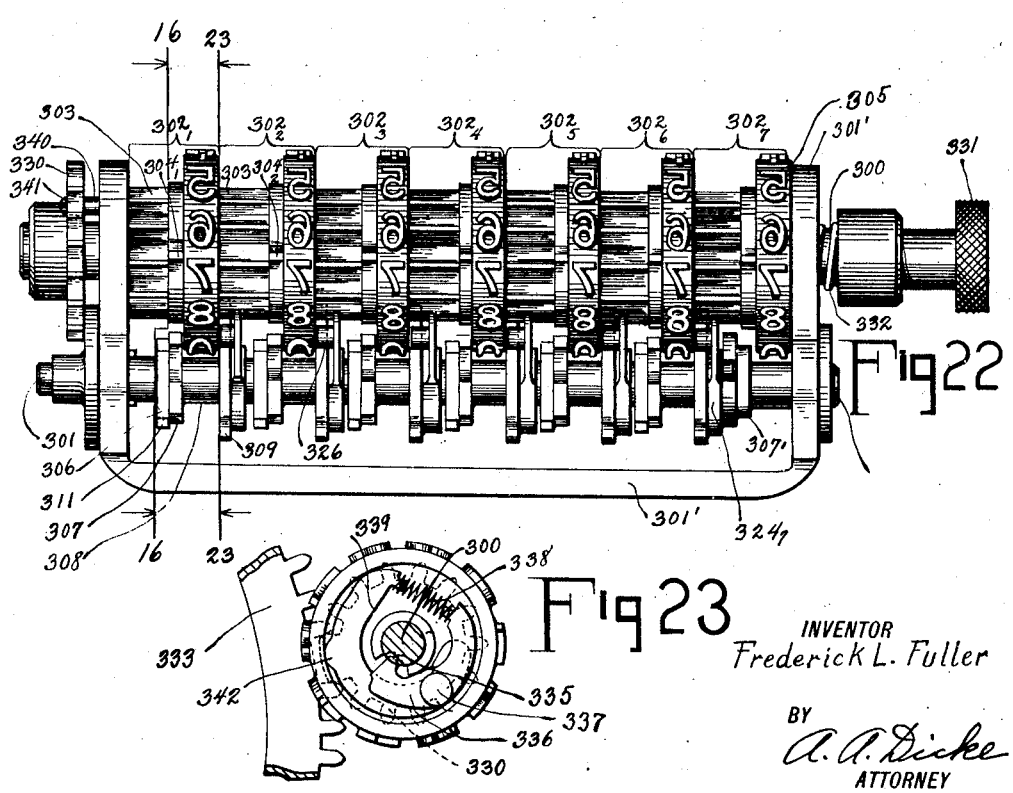
INVENTOR
Frederick L. Fuller
BY
A. A. Dicke
ATTORNEY

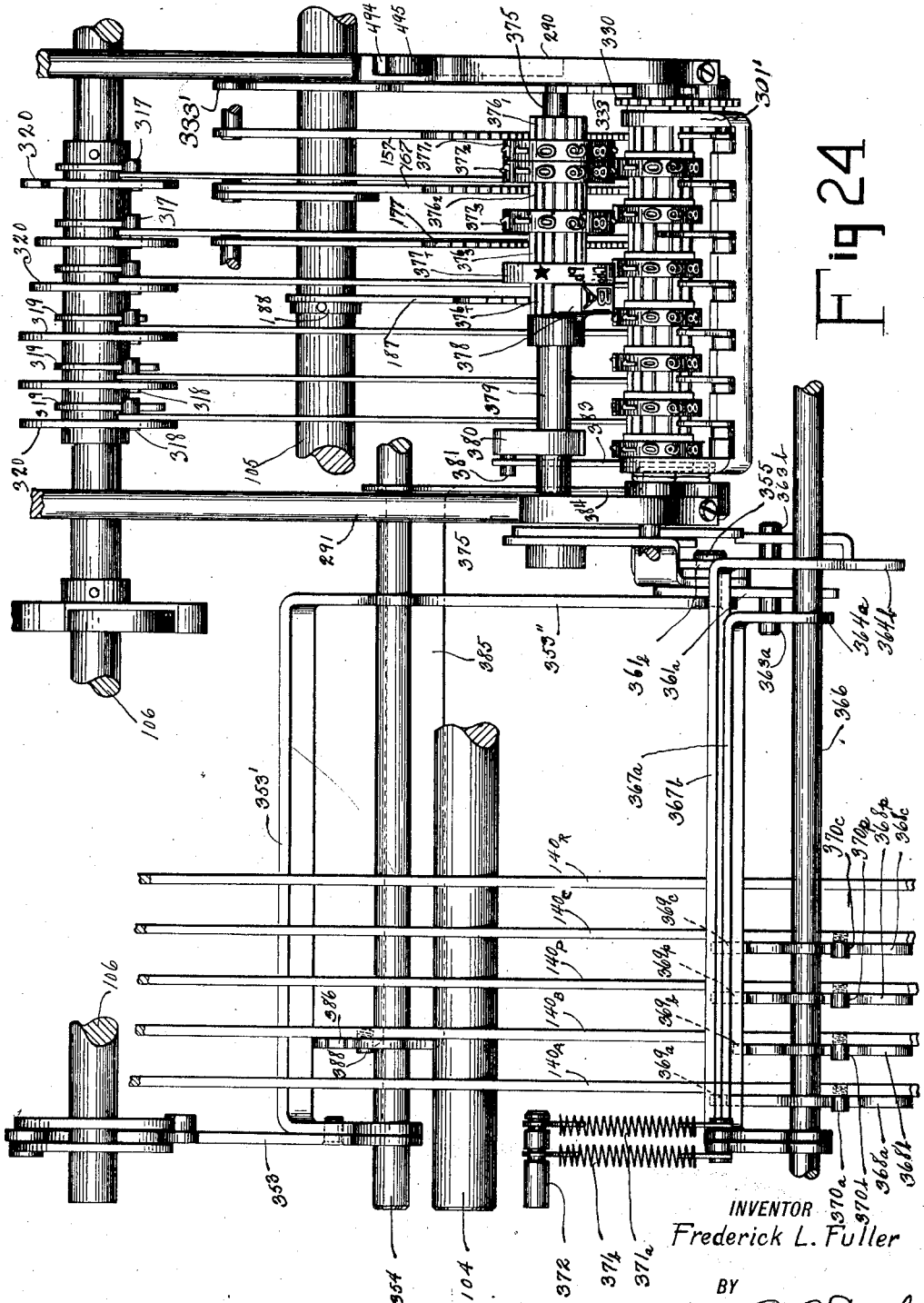

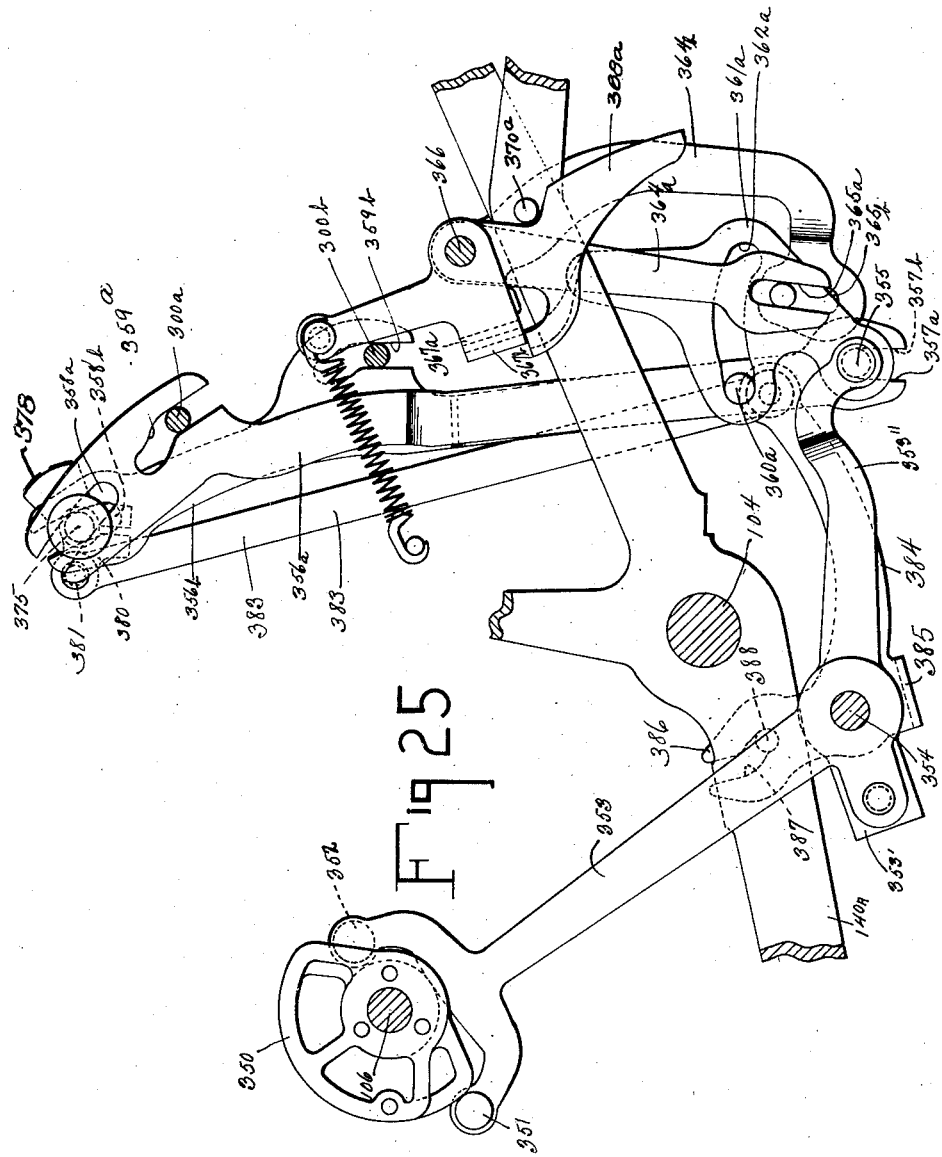

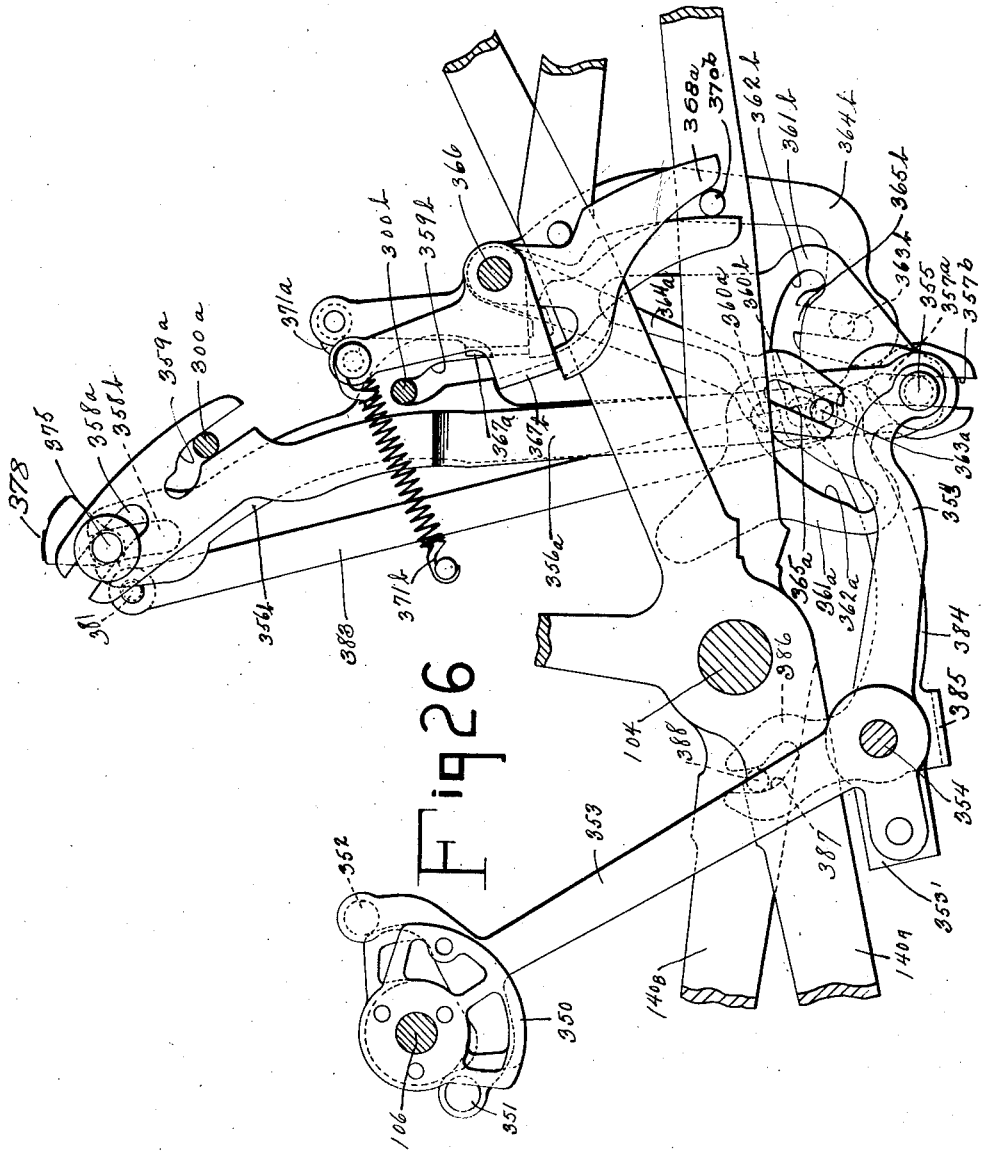

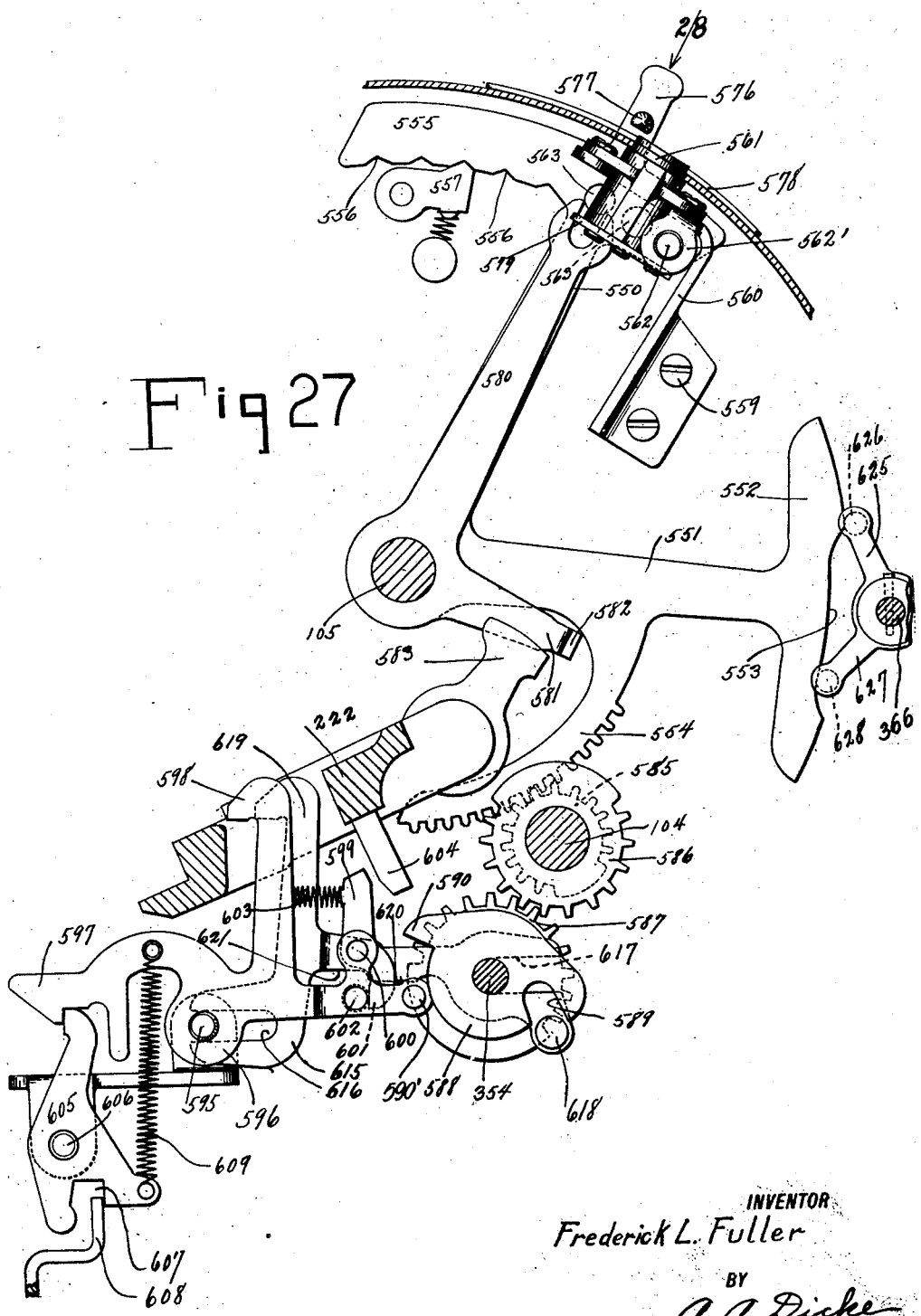

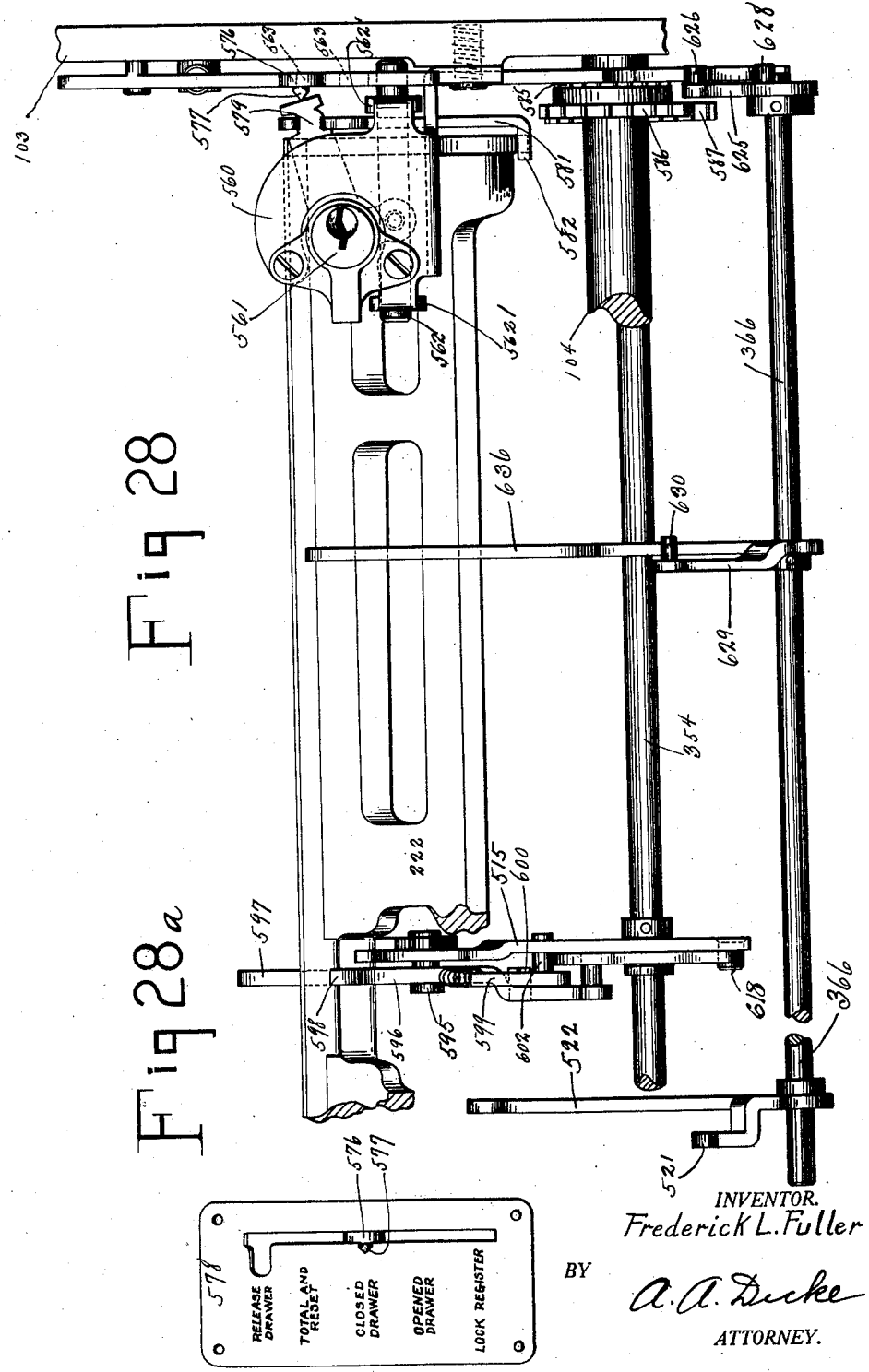

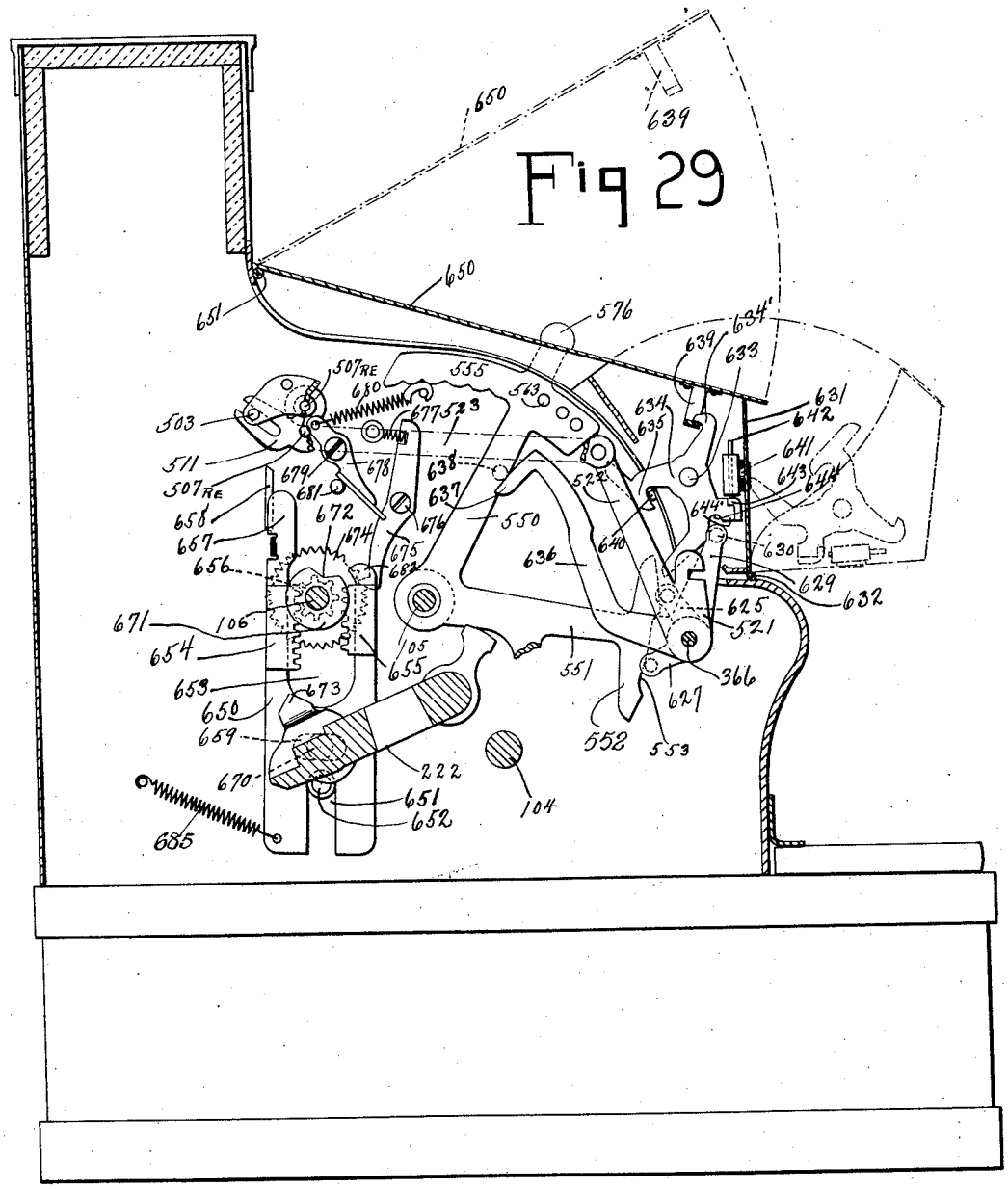

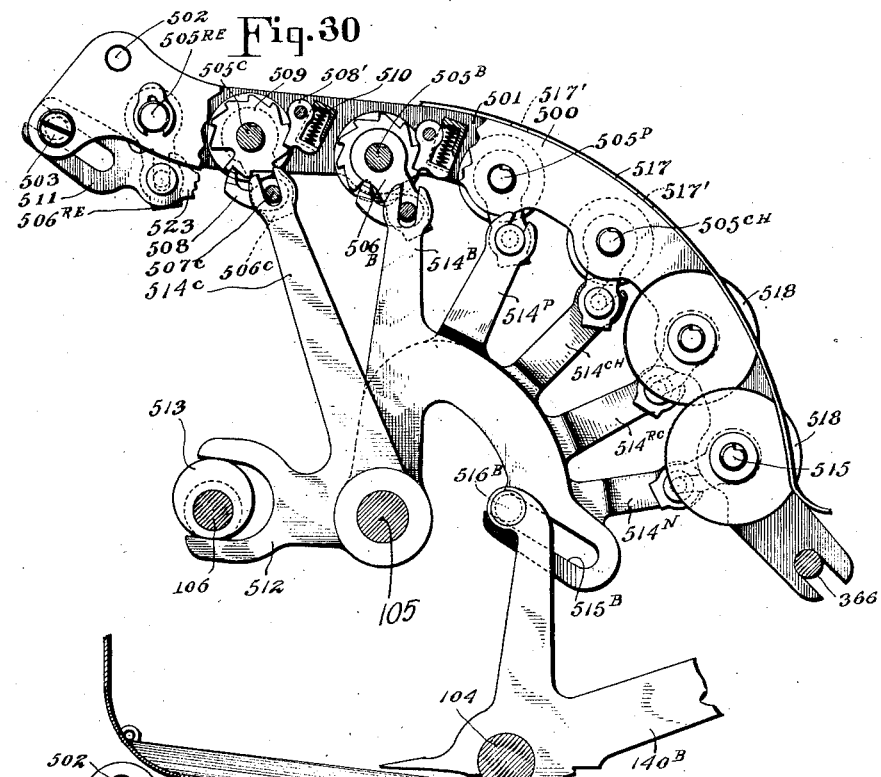
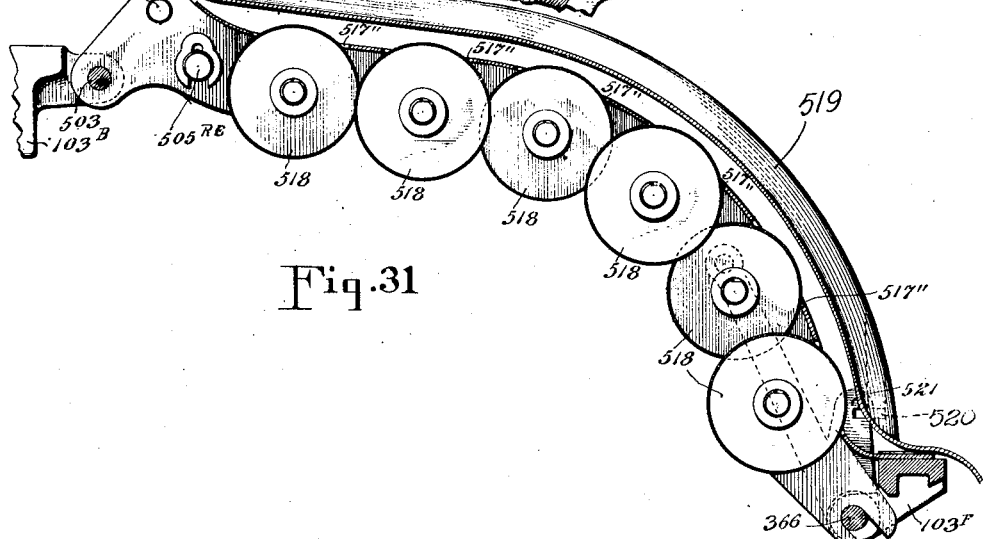

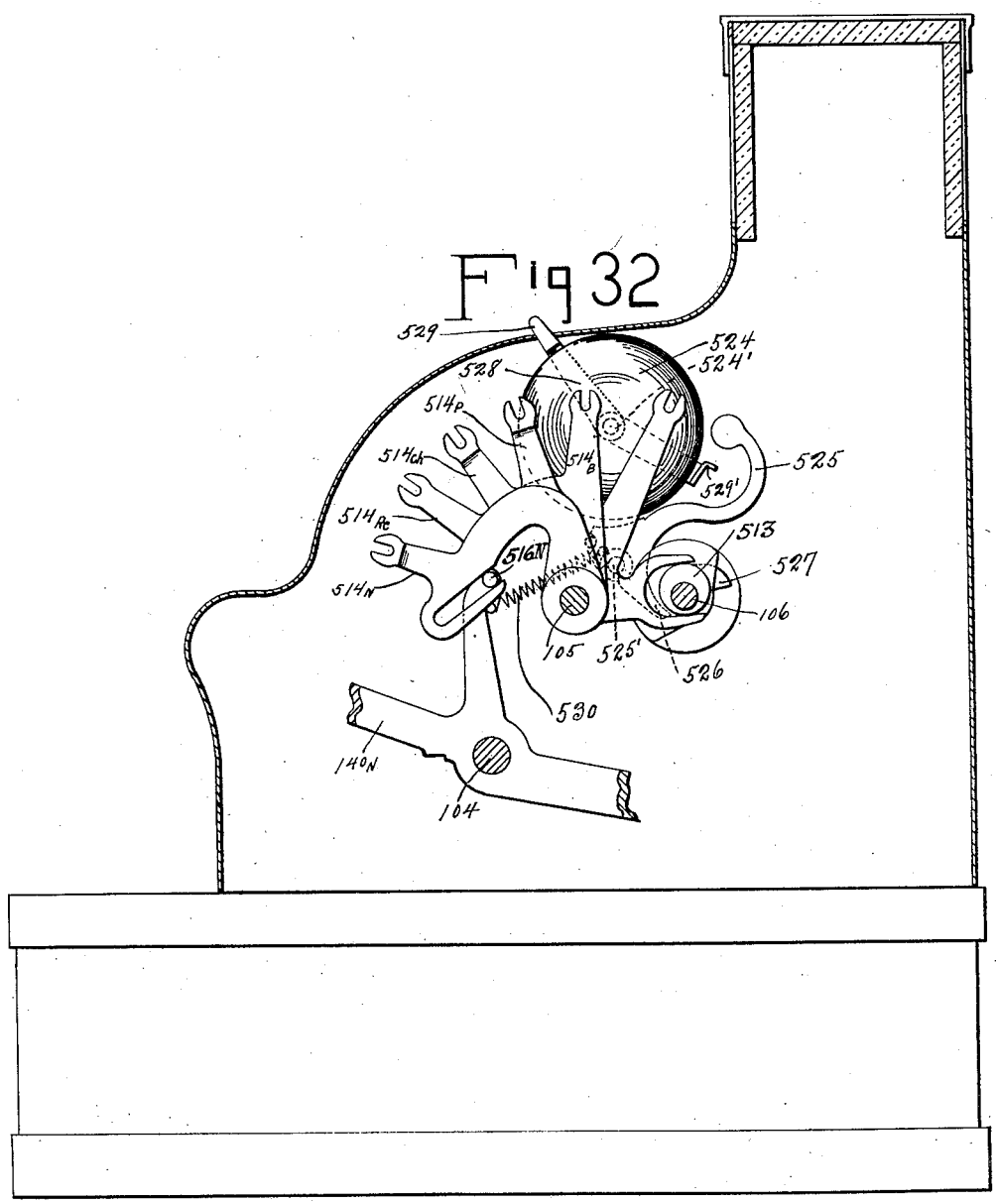

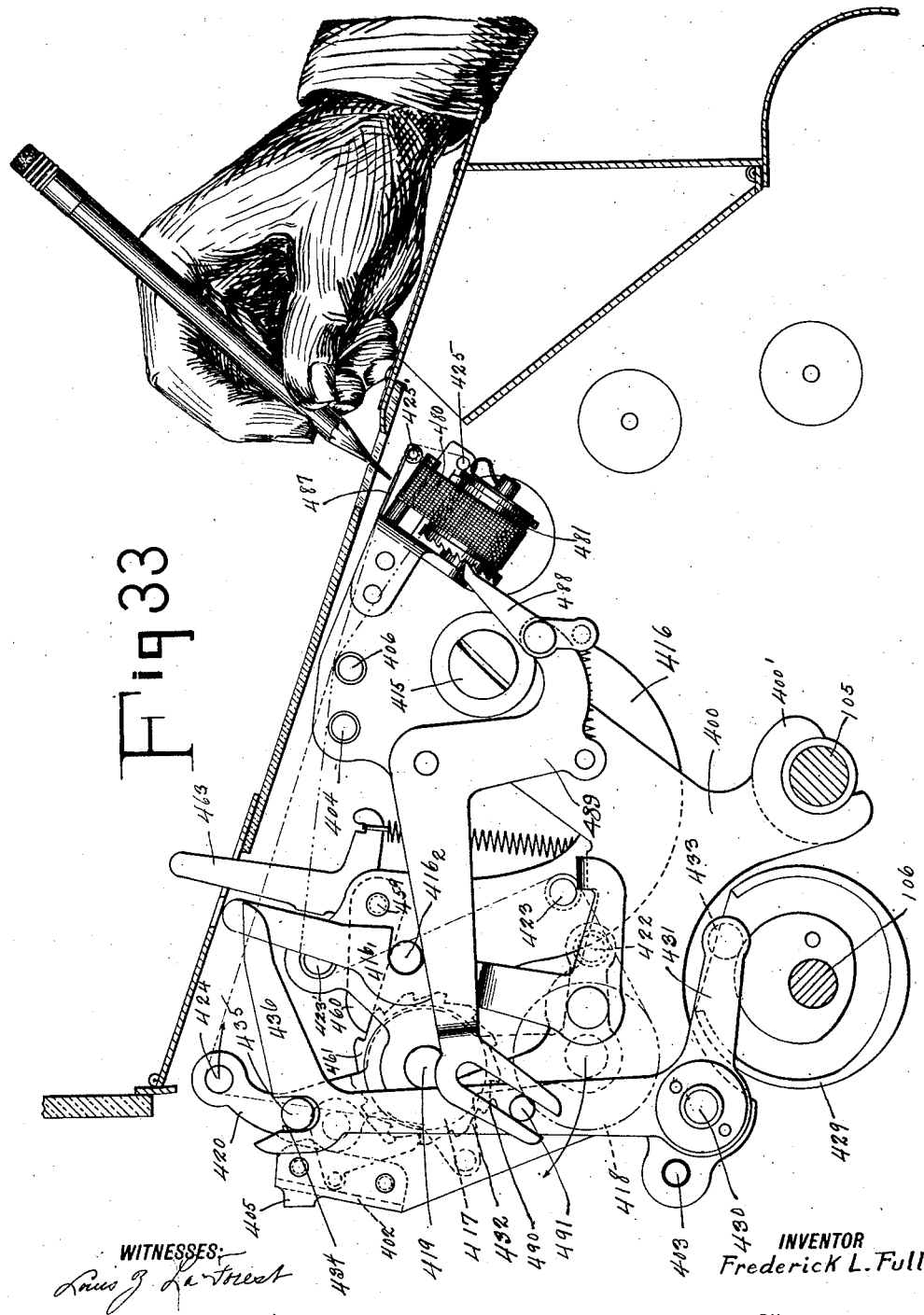

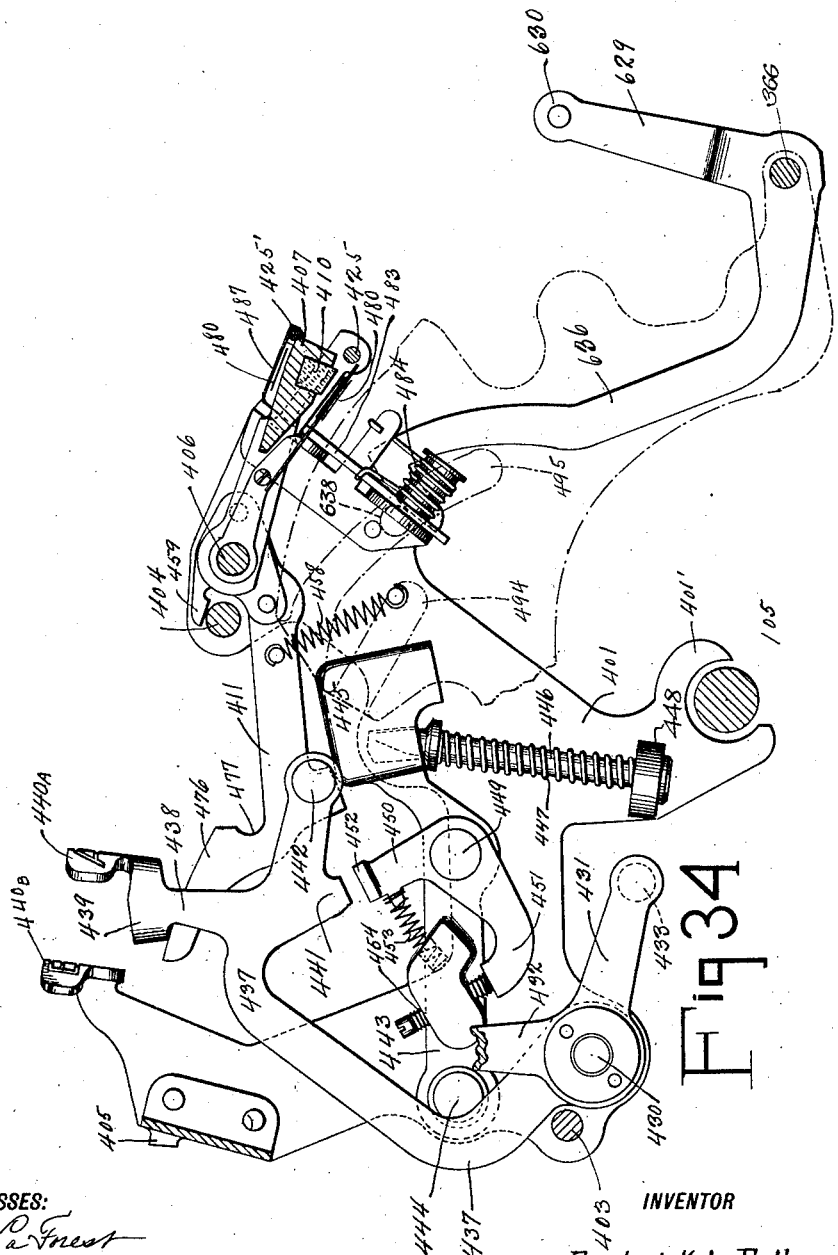

Jan. 7, 1930.  F. L. FULLER  1,742,701
KEY OPERATED CASH REGISTER
Filed Nov. 19, 1918    24 Sheets-Sheet 22

WITNESSES:
Louis G. LaFrest

INVENTOR
Frederick L. Fuller
BY
A. A. Dicke
ATTORNEY

INVENTOR.
Frederick L. Fuller

Patented Jan. 7, 1930

1,742,701

UNITED STATES PATENT OFFICE

FREDERICK L. FULLER, OF BRIDGEPORT, CONNECTICUT, ASSIGNOR, BY MESNE ASSIGNMENTS, TO REMINGTON ARMS COMPANY, INC., OF NEW YORK, N. Y., A CORPORATION OF DELAWARE

KEY-OPERATED CASH REGISTER

Application filed November 19, 1918. Serial No. 263,125.

This invention relates to an improved key operated cash register, and has for its objects the provision of a generally improved machine of this type. Certain of the mechanisms disclosed herein are, nevertheless, adaptable to machines of other types than the key operated machine in connection with which they are shown.

More specific objects are the provision of an improved key action; improved tablet amount indicators; vertically reciprocatable rotatable transaction indicators, serving also as a flash; improved interlock. necessitating the operation of a clerk's key before other keys may be operated; flexible key coupler; improved counters and means for throwing them into and out of mesh with the differentially actuated registering segments at specified times; a segment frame lock; improved drawer release means; and, an improved arrangement of the special counters.

Another specially important object is the provision of an autographic record strip on which the details of each transaction are automatically recorded, and means for printing the totals accumulated on the counters on the strip.

Another object is the provision of an improved locking construction which permits the control of the machine by a single lock. A second lock may, however, be provided for giving access to the record strip so that it may be replaced by a clerk who would, nevertheless, not have access to the other parts of the machine.

With these and incidental objects in view, the invention consists in certain novel features of construction and combination of parts which are set forth in the appended claims and a preferred form of embodiment whereof is hereinafter described with reference to the drawings which accompany and form part of the specification.

*General description.*—The device of my present invention is a thirty-one key, key operated cash register, comprising nine penny keys, nine dime keys, seven dollar keys, four transaction keys, and two clerks' keys.

The machine is provided with an interlock to prevent its operation until one of the clerk's keys has been depressed to a full stop (in the machine illustrated this occurs after a 4½ degree movement). The operation of any other key unlocks the operated clerk's key and permits all operated keys to be depressed to the limit of their stroke (20 degrees in the present machine).

As is customary in machines of this type, I have provided back hangers to prevent the operation of more than one key in any series. The connections between the keys and the parts operated thereby consist of studs or rollers on the keys, operating in cam slots in the registering or special key frame. The slots are formed with dwells at their ends so as to permit a movement of 4½ degrees of the keys at the beginning, and 2½ degrees at the end of their strokes without moving their respective frames. This provides an initial movement to accomplish certain necessary functions such as hooking the keys to the coupler, unlocking the segment frame and throwing the selected counter into mesh at the beginning of the stroke and giving time for the printing operation, and throwing the counter out of mesh at the end of the down stroke and at the beginning of the up stroke. These dwells also permit much larger tolerances in certain parts of the machine and therefore permit of a much cheaper construction.

On account of the dwells in the cam slots I have found it possible and desirable to provide this machine with a flexible key coupler which allows the operation of the machine by successively depressing the desired keys until they become attached to the coupler, whereupon the complete operation may be effected by the depression of any one of the operated keys. For indicating the amount of the transaction and the clerk who operated the machine, I have provided a series of groups of tablet indicators. These groups consist of nine penny tablets, nine dime tablets, seven dollar tablets and two clerks' tablets. The tablets of each group are arranged one behind the other from front to back. The transactions are indicated by suitable indicia on rotatable indicator bars. These transaction indicator bars extend across the machine, and bear the words "Cash", "Received on account", "Charge", and "Paid out" on their faces. These bars are located adjacent the tablet indicators and are raised and lowered at each operation and in this way serve as a "flash" to conceal the indicator tablets until the machine is completely operated. The segment shaft carries three registering frames and a special key frame. Each of these frames is locked against displacement in home position until one of the keys of its bank has been depressed to about 4½ degrees.

In the present machine I have provided two counters for totalizing the sales of two clerks, or, if desired, of two departments. The counters are arranged concentrically with the segment shaft and are operated by a single set of registering segments. I have also provided a novel counter control means for throwing out the "B" counter when the "A" key is depressed, or vice versa and for throwing out both counters when the "Charge", "Paid out" or any other desired special key is depressed. The counters themselves comprise novel features, relating particularly to the transferring means and devices for preventing overthrow of the counters due to momentum.

The machine is provided with a record strip on which is printed the amount and character of each transaction, as well as the initial of the clerk. This record strip is mounted in a frame which may be tilted forward to automatically print on the record strip the totals appearing on the counters. I regard this as a very important feature because it provides a printed record of all details and totals which may be stored away for future reference, or sent to the proprietor or head office for auditing. This construction precludes all possibility of error in reading and transcribing the totals as is necessary with the ordinary reading counter. This strip is of such a width that it can be used as an autographic record strip and is so arranged that the record of the last transaction becomes immediately visible and any desired notation may be made in connection with such record, if desired. The machine is provided with a cash drawer automatically opened by the operation of the machine, a bell to indicate that the machine has been operated, and a muffler for the bell, which features are common in machines of this kind, but the constructions I have provided comprise certain detail improvements.

The invention contemplates an improved locking construction which comprises a lever controlled by a master lock which may be set in several different positions for controlling the operation of the machine. A second lock is provided to permit the opening of the top lid so that the record strip may be replaced by a clerk who will, nevertheless, not have access to the main locking means of the machine.

I have also provided a group of special counters, comprising a reset counter, customer counter, "B" (or "A") counter, and "Charge", "Paid out", "Received on account" and "No sale" counters.

Referring to the drawings attached hereto:

Fig. 1 is a front elevation of a machine embodying my invention.

Fig. 1ª is a vertical sectional view through the machine looking to the right, taken just to the left of the dollar bank, certain parts having been omitted or cut away, and others being shown merely in outline.

Fig. 1ᵇ is a detailed section on line b—b of Fig. 3, and

Fig. 1ᶜ is a section on line c—c of Fig. 3.

Fig. 2 is a view similar to Fig. 1 showing the parts in position, with the $7 key depressed.

Fig. 3 is a top view of the key coupler and keys, the latter broken away at their ends.

Fig. 4 is a plan view of the machine with parts omitted.

Fig. 8 is a back view showing a clerk's key partly depressed.

Fig. 9 is a similar view showing a clerk's key, a transaction key and an amount key fully depressed.

Fig. 10 is a fragmentary back elevation of the machine showing a modification of the construction shown in Figs. 8 and 9.

Figs. 11, 12 and 13 are other views illustrating this modification.

Fig. 14 is a side view of part of the machine showing the transaction indicator and its control means, after a "Paid out" operation.

Fig. 15 is similar to Fig. 14 but shows the transaction indicator after a "Cash" operation.

Fig. 16 is a sectional view of the counter taken on the line 16—16 of Fig. 22 looking in the direction of the arrows, showing the counter in normal position.

Fig. 17 is a view similar to Fig. 16 after the penny wheel has been advanced one step and has tripped the transfer spool.

Fig. 18 is a perspective view of the transfer spool.

Fig. 19 is a side view of the transfer rail showing the spirally arranged transferring cams.

Fig. 20 is a view similar to Fig. 17 taken at the end of the transfer operation.

Fig. 21 is a view similar to Fig. 20 with parts omitted.

Fig. 22 is a back view of the counter, looking in the direction of the arrow 22 in Fig. 16.

Fig. 23 is a view on the line 23—23 of Fig. 22 with parts omitted.

Fig. 24 is a plan view of the counter control means.

Fig. 25 is a side view showing the counter control means and means for shifting the clerk's initial printing segment.

Fig. 26 is a view similar to Fig. 25 showing the "B" key depressed to the limit of its stroke.

Fig. 27 is a side view showing the construction of the locking devices.

Fig. 28 is a top view of the locking devices looking in the direction of the arrow 28 in Fig. 27.

Fig. 28$^a$ is a top view of the lock lever plate.

Fig. 29 is a view of the locking means showing its cooperation with the various parts of the machine.

Fig. 30 is a view of the special counter frame looking to the right, with a part of one side plate cut away.

Fig. 31 is a similar view showing the parts in side elevation.

Fig. 32 is a side elevation of the special counter actuating arms and shows also the bell mechanism and bell muffler.

Fig. 33 is a side elevation of the printing mechanism showing the course of the record strip by dotted lines.

Figure 35:
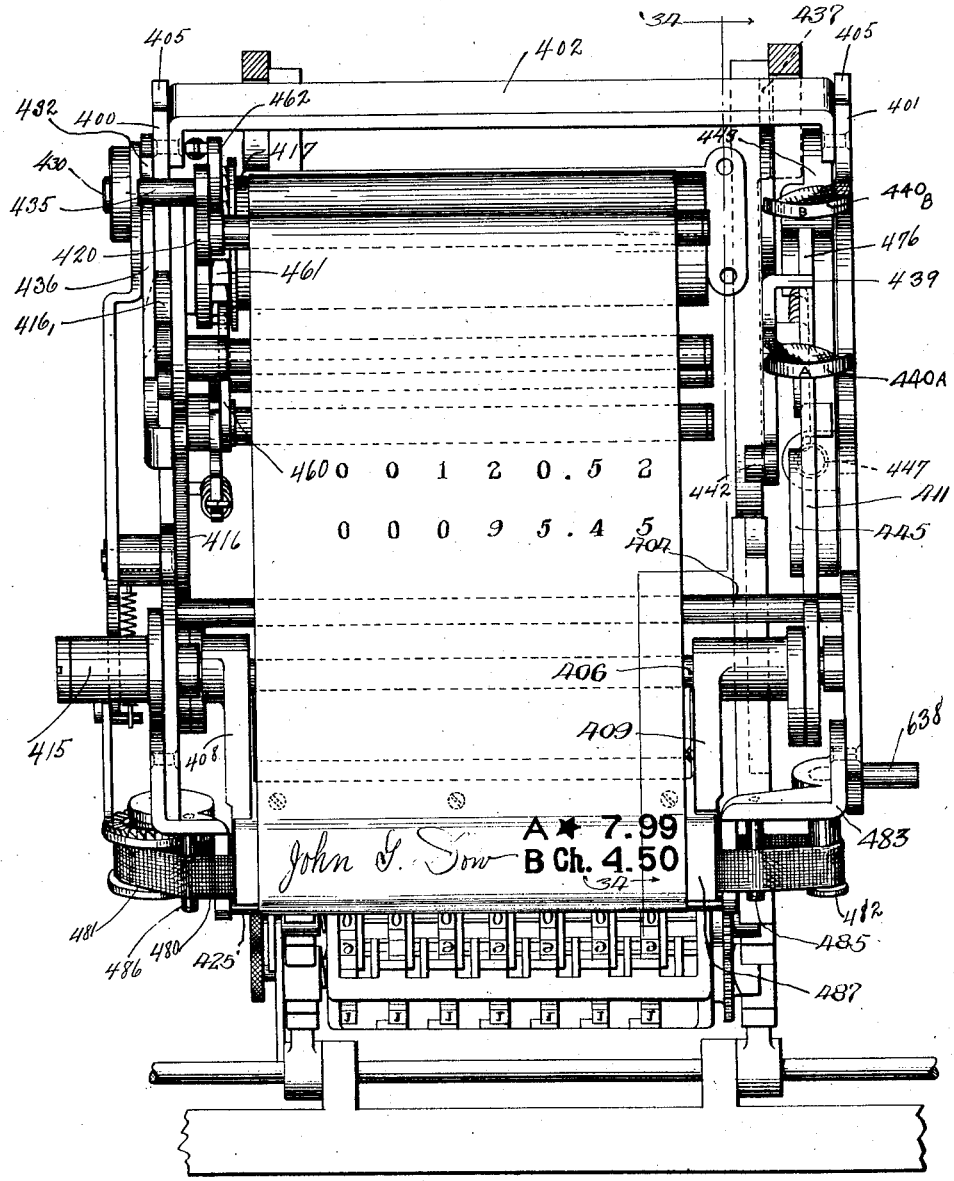

Fig. 34 is a vertical section taken on the line 34—34 of Fig. 35.

Fig. 35 is a plan view of the printer.

Figure 36:
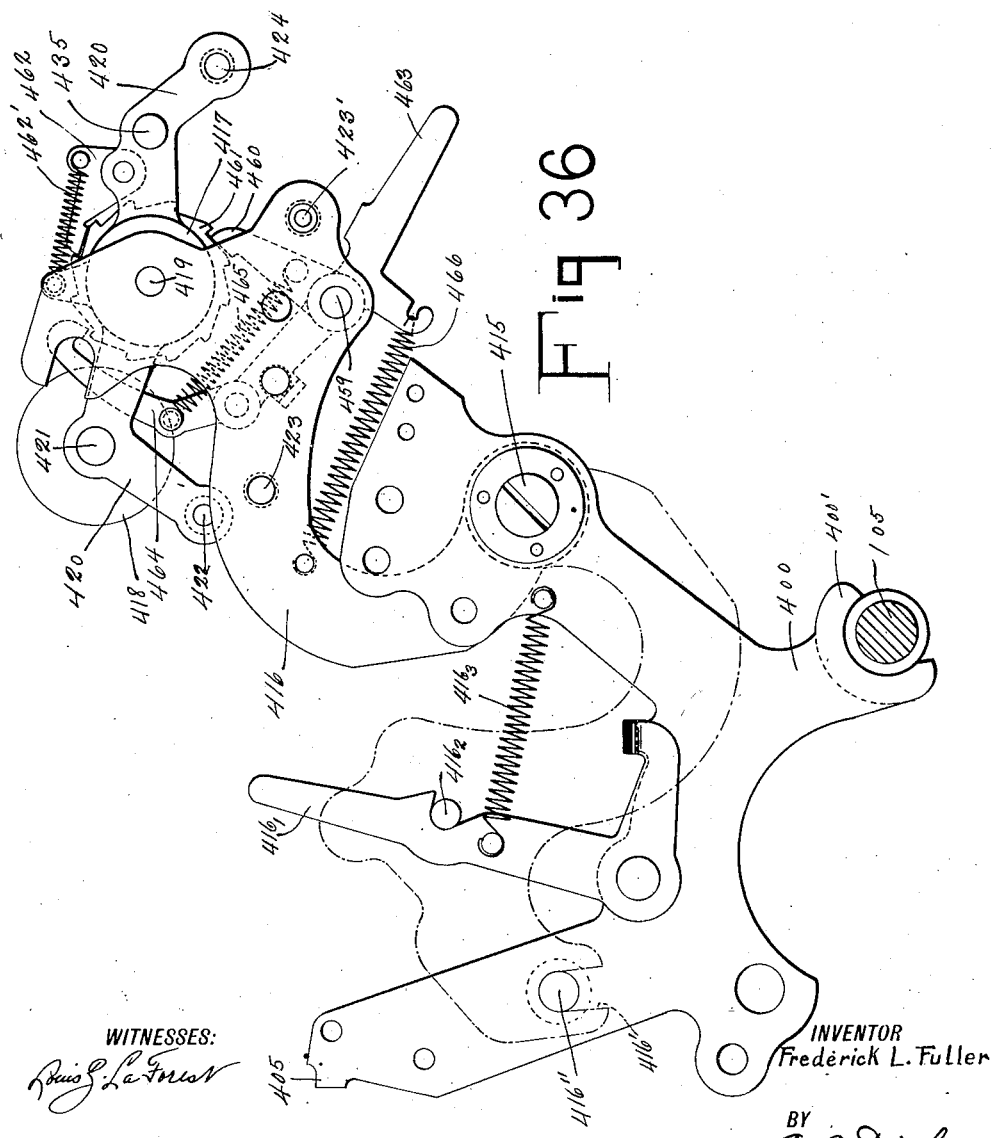

Fig. 36 is a side view of the printer showing the paper frame rocked forward.

Figure 37:
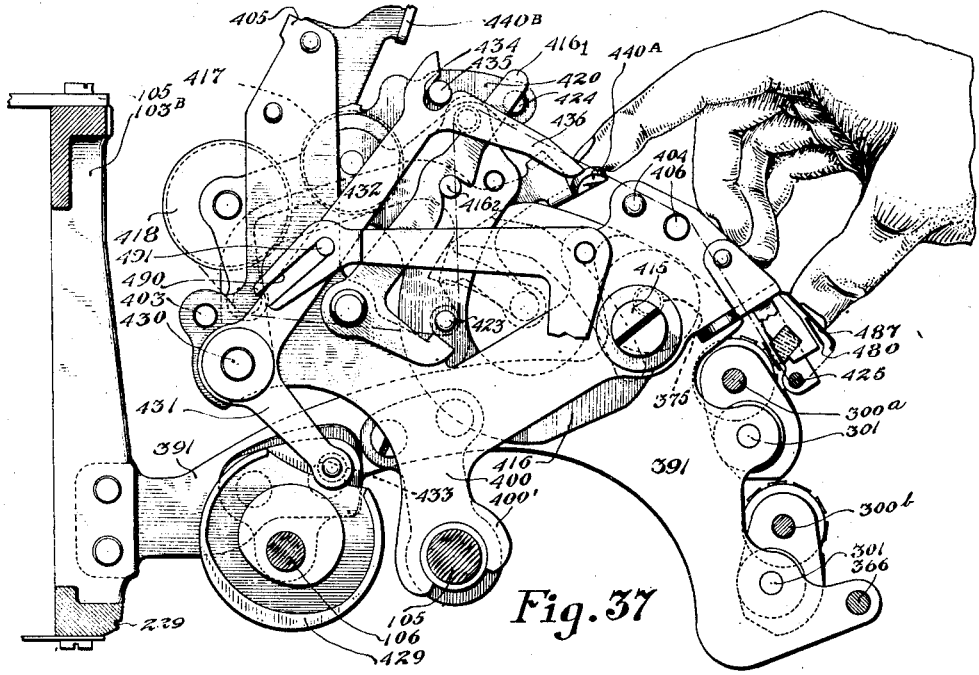

Fig. 37 is a side view of the printer mechanism looking from left to right, the printer mechanism having been tilted forward to take an impression from the upper totalizer.

Figure 38:
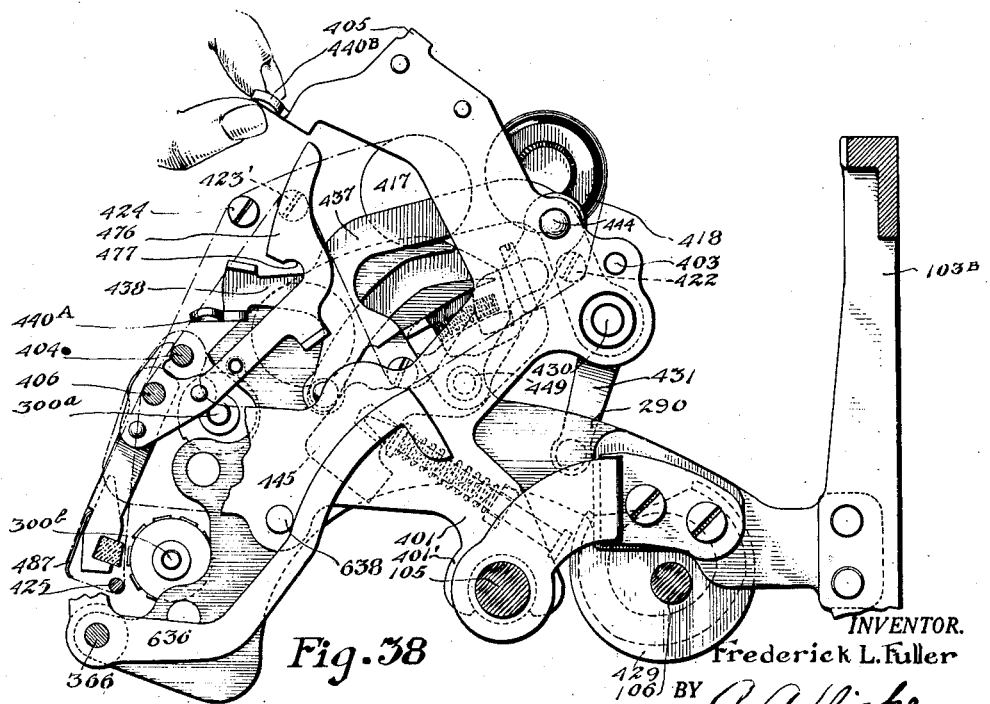

Fig. 38 is a side view of the printer mechanism looking from right to left the printer mechanism having been tilted forwardly to take an impression from the lower totalizer.

Figure 1:
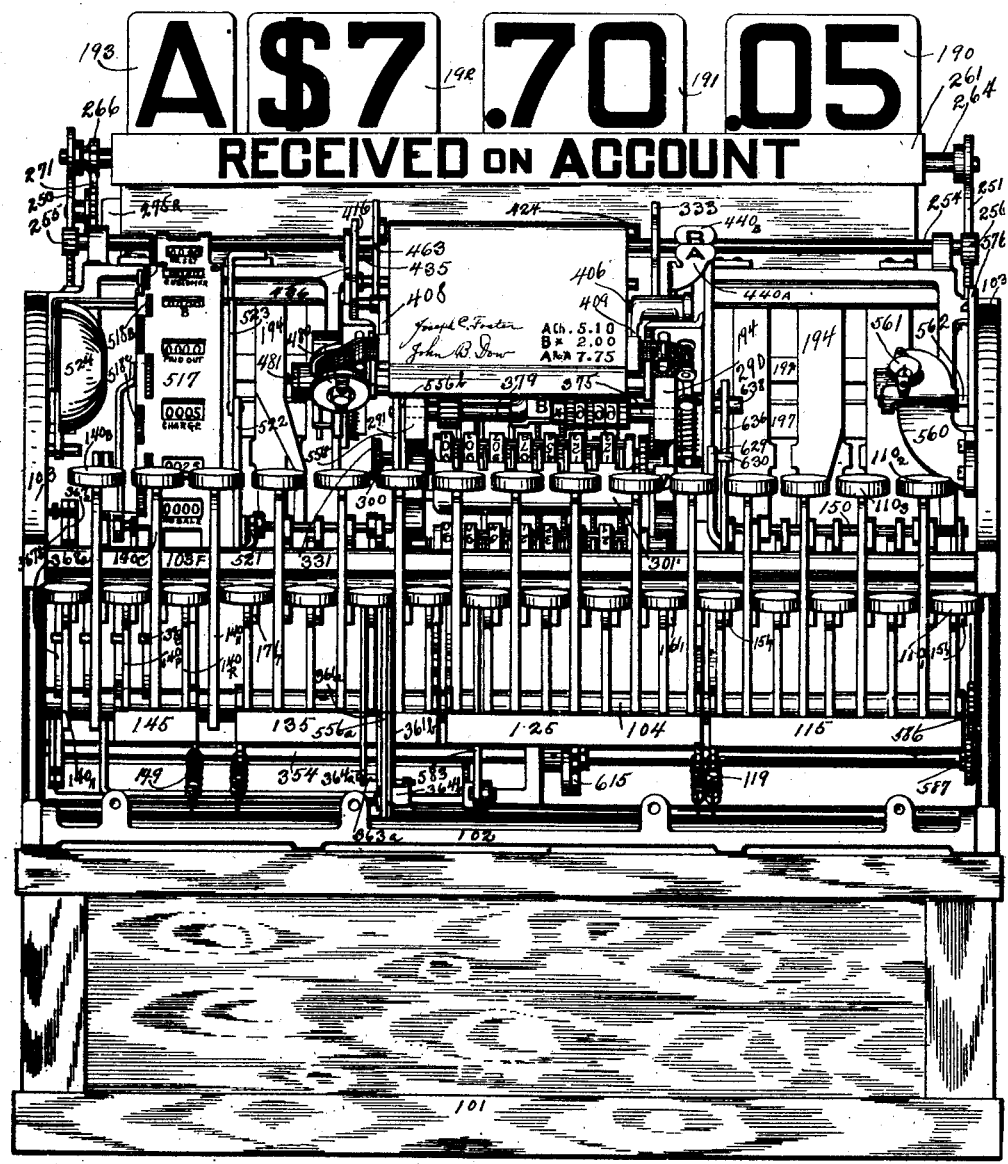

Referring to the annexed drawings and more particularly to Fig. 1$^a$, and Fig. 2, the numeral 100 indicates the enclosing cabinet which may be made of metal or wood or any other suitable material. 101 indicates the drawer base which houses a slidable drawer and serves as a support for the machine proper. 102 refers to the bottom plate or base of the machine which is preferably constructed of metal and serves as a support, at either end, for the metal side plates 103 connected by the front tie bar 103$_F$, a back frame 103$_B$ and a back tie rod 103$_G$. These side plates support, in suitable bearings, a key shaft 104, segment shaft 105, and a rotation shaft 106 which extend transversely through the machine. The rotation shaft 106 is turned through one revolution at each operation of the machine, by means to be described later.

In the particular embodiment of the invention illustrated there are three series or groups of manipulative controlling means shown as adjustable levers, or depressible keys. The three series are distinct by virtue of the type of functions controlled thereby. The one series shown as amount determining keys or levers perform the function of manipulative amount determining devices for variously measuring the excursions of the totalizer actuators. The second series are shown as key operated computation controlling means and are used to determine the type of computation to be performed, as for example "Charge", "No sale", "Paid out", and "Received on account". The third group or series is shown as initialed releasing or unlocking keys which must be partially operated prior to the operation of any other keys or levers of the remaining series. Each of these unlocking levers or keys perform the function of identifying the individual operating the machine, to unlock the machine for operation, and to select a particular totalizer to be actuated. The third series therefore constitute a group of identifying keys or levers adjustable as a preliminary to an operation of the machine to predetermine the totalizer to be actuated. At the extreme right of the machine are nine penny keys, corresponding to the amounts 1¢ to 9¢ respectively, thereby representing all the digits of the units denomination of the decimal system of counting. Adjacent the penny or units keys are nine keys marked to represent all the digits of the tens, or dimes denominational order. The third, or dollars denominational order keys are adjacent the dimes keys, and are incomplete in this particular machine, the digits 1 to 7 only being illustrated. It is obvious that more or less digits in each denominational order or, more or less denominational orders, may be provided, and further that the digital keys of each order may be varied to calculate in non-decimal systems such as the British, or East Indian monetary systems.

Each of the keys or levers of each series are constructed so that when released by a clerk's releasing and totalizer selecting key they are optionally operable manually controlled driving means for the machine, as will more clearly be seen from the following detailed description.

In the drawings, see Fig. 4, the penny keys have been numbered 110$_1$ to 110$_9$ inclusive, the subscript indicating the value of the key in cents; the dimes keys have been numbered 120$_1$ to 120$_9$ inclusive, the subscript indicating the value of the key in dimes; and the dollar keys have been numbered 130$_1$ to 130$_7$ inclusive, the subscript indicating the value of the key in dollars. The transaction keys have been numbered 140$_N$, 140$_R$, 140$_C$, and 140$_P$, the subscript indicating the functions "No sale", "Received on account", "Charge" and "Paid out". The clerks' keys are designated by the numerals 140$_A$ and 140$_B$.

Referring to Fig. 1$^a$, the numeral 130$_7$ indicates the $7 key. This key, as well as all the other keys, is mounted on the shaft 104 and carries an upwardly extending projection 131 carrying a stud or roller 131' for rotating the registering segment of the proper bank according to the value of the key operated, in a manner to be described hereinafter.

The keys extend to the back of the machine and are provided with a hook portion 132 having a cylindrical face 133 located above the notch 134. The key is also provided with the face 135'' for engaging with and lifting the indicator targets, and the extension 136 for cooperating with suitably mounted pendants which are to be described hereinafter. The keys may also be provided with a stop shoulder 136' for abutting against the back frame 103$_B$ at the end of the down stroke. Normally the keys rest on the rear edge of the base frame as shown in Fig. 2.

Figure 5:
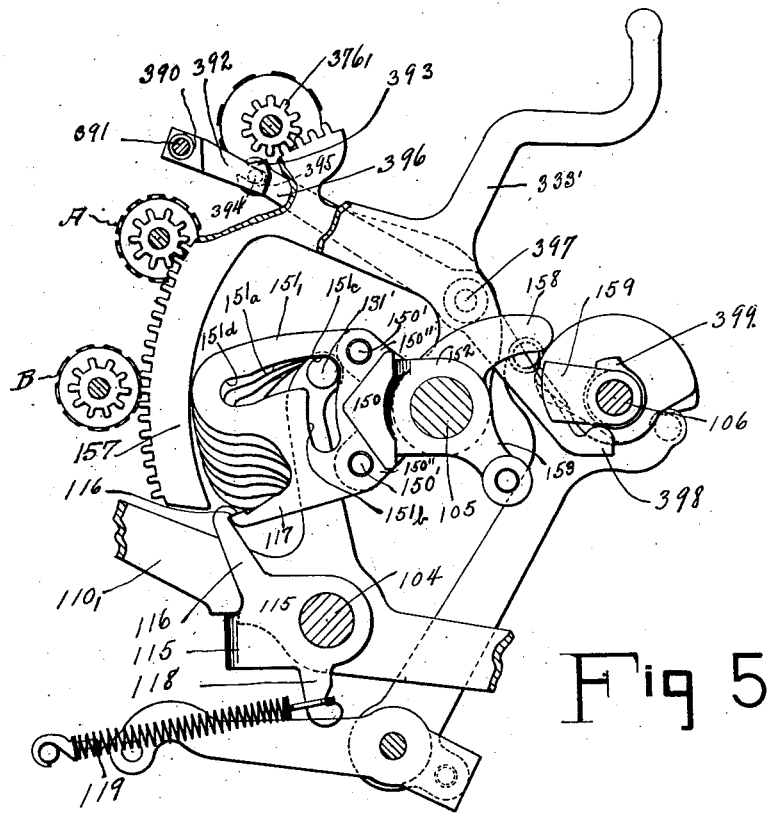
Fig. 5 is a fragmentary sectional view looking to the left, taken just to the right of the penny bank.
Figure 6:
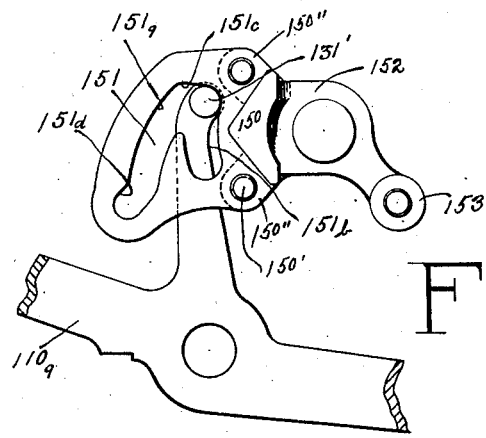
Fig. 6 is a similar view showing the 9¢ key and its cam plate.

Referring now to Figs. 4, 5 and 6 the keys 110$_1$ to 110$_9$ are provided with upwardly extending arms carrying the operating rollers or studs 131' for cooperating with suitably graduated cam slots in the cam plates 151$_1$ to 151$_9$ of the normally locked key controlled totalizer actuators respectively. The form of these slots is more clearly shown in Fig. 5 and Fig. 6. The 1¢ cam plate 151$_1$ has an L-shaped cam slot composed of the horizontal part 151$_a$ and the vertical part 151$_b$. The cam slot is provided with portions 151$_c$ and 151$_d$ which are so formed with respect to the key shaft that the roller 131' may move for a short distance near the beginning and end of its travel without rocking its cam plate. These parts 151$_c$ and 151$_d$, therefore, constitute "dwells" in the slot. Fig. 6 which shows the 9¢ key and its cam plate, illustrates the formation of these "dwells" in the plates more clearly. The vertical portion of the cam slots is provided for clearance so as to permit the upward tilting of the cam plates without interfering with the studs on those keys which have not been operated. As shown in Fig. 2, the more or less horizontal parts of the cam slots are formed at a progressively decreasing angle to the stud bearing arm on the key so that the plates will be tilted upwardly around the shaft 105 according to the value of the key operated.

The cam plates 151$_1$ to 151$_9$ are carried by the registering frame 150 pivotally mounted on the shaft 105 extending through openings in the arms 152 (Fig. 6). These arms are further provided with extensions 153 and 154, provided with openings in which the rod 155 is rigidly mounted. This rod 155 extends toward the center of the machine and is engaged in an aperture in the backward extension 156 of the registering segment or totalizer driving means 157. The cam plates may be attached to the registering frame or totalizer actuating mechanism in any desired manner, but I have found it preferable to provide said frame with spaced slots for receiving these plates. They are held in place by means of pins 150'.

As in the case of the penny bank, I have provided a series of cam plates 161$_1$ to 161$_9$. These plates are attached to the dime registering frame 160 which is pivotally mounted on the shaft 105 by means of the arms 162. Directly attached to this frame is the dime segment 167 by means of a rivet 165 passing through an extension 166 on the segment.

In the dollar bank there are seven such cam plates, 171$_1$ to 171$_7$, carried by the registering frame 170, pivotally carried by means of arms 172 upon the shaft 105. The rearwardly extended portions 173 and 174 are provided with openings in which the rod 175 is rigidly mounted. Near the center of the machine this rod takes into an aperture in the rearward extension 176 of the dollar segment 177 pivotally mounted on the shaft 105.

The special key blank comprises three cam plates 181$_R$, 181$_C$, and 181$_P$, cooperating with the studs on the "Received on account", "Charge", and "Paid out" keys respectively. These plates are carried by the frame 180 provided with perforated arms 182 through which passes the shaft 105. This frame is pinned to the shaft by means of a pin 183. The initial printing segment 187 is also pinned to the shaft 105 near the center of the machine by means of the pin 187'. It will be seen that the shaft 105 and its attached segment 187 will be differentially rotated by these three special keys for a purpose to be described hereinafter.

I have provided an improved locking means for locking each of the registering frames in normal position, means for unlocking the registering frames, and means for positively returning the registering frames to home position.

To this end I have provided the bails 115, 125, 135 and 145, for the penny, dime, dollar and special banks respectively. Referring to Fig. 5, the bail 115 is provided with an upwardly extending hook 116 which cooperates with the arm 117 attached to the 1¢ cam plate 151. The bail has right angularly bent arms provided with an aperture through which the key shaft 104 passes. In this way, the bail is pivotally supported by said shaft. It is provided further with a downwardly extending arm 118 to which is attached the spring 119 for normally holding the bail in position to lock the segment frame against operation. The segment frame is provided with a rearwardly extending arm 158 which cooperates with the cam 159 on the rotation shaft. The operation of this locking means is as follows: During the first 4½ degrees of movement of the key 110₁ the stud 131′ moves forward in the dwell of the cam slot. The registering frame has not yet moved, but the operated key has tilted the bail so that the hook 116 has become disengaged from the arm 117. In the mean time the rotation shaft has rotated far enough to permit the cam 159 to clear the arm 158. When the key is now fully depressed, the registering frame and its attached parts are rocked around the shaft 105. During the up-stroke of the key, the parts return to normal position by the action of the stud 131′ in its slot and the action of the cam 159 on the arm 158.

I have described specifically only the construction relating to the penny bank but this will suffice for the other banks which have a similar construction. The registering frames being provided, for instance, with the arms 168, 178, and 188 cooperating with the cams 169, 179 and 189 on the rotation shaft.

The amount and clerks' indicators of my present invention are of the tablet type. Referring to Fig. 4, it will be seen that these are arranged in four groups. Group 190 consists of nine tablets bearing the numerals .01 to .09 respectively, on the front and back, serving to indicate values from 1¢ to 9¢. Group 191 consists of nine tablets indicating values from 10¢ to 90¢, while group 192 consists of seven tablets indicating values from $1 to $7. Group 193 consists of two tablets bearing the letters A and B to indicate the initial of the clerk who last operated the machine.

These tablets are supported by stems 194 slidably supported in notches in the plates 195, (Fig. 14) attached to the back frame of the machine. The stems are suitably offset transversely at their lower ends to rest above the key corresponding to the number on the tablet.

The indicator stems are each provided with a rearwardly extending lug 196 for cooperating with the back supporting bar 197 oscillated backward and forward by means of the link 198 operated by the cam 199 on the rotation shaft 106, see Fig. 14. In this way the lugs 196 of the operated tablets are caught above and supported by the back rod so that the selected tablets are exposed to view until the machine is again operated. The next operation permits the tablets to drop and causes the elevation and exposure of the newly selected tablets.

In order to start the tablets down to normal position, I have provided a bail 197′ extending across the machine above the supporting bar 197. This bail is pivoted to the side plates at 197″ and is held down by spring 197‴ (Fig. 1ª).

*Interlock.*—I will now describe my improved form of interlock, which comprises means for compelling an operation of a releasing and totalizer selecting key or lever to render the totalizer driving means effective. Such mechanism is useful to compel the operator to identify himself by means of a visual indicator and by means of a characteristic symbol which appears on the record strip. When a releasing and selecting key or lever is partially actuated any of the other keys or adjustable levers for controlling the operating mechanism of the different series may be manipulated at the option of the operator.

Figure 7:
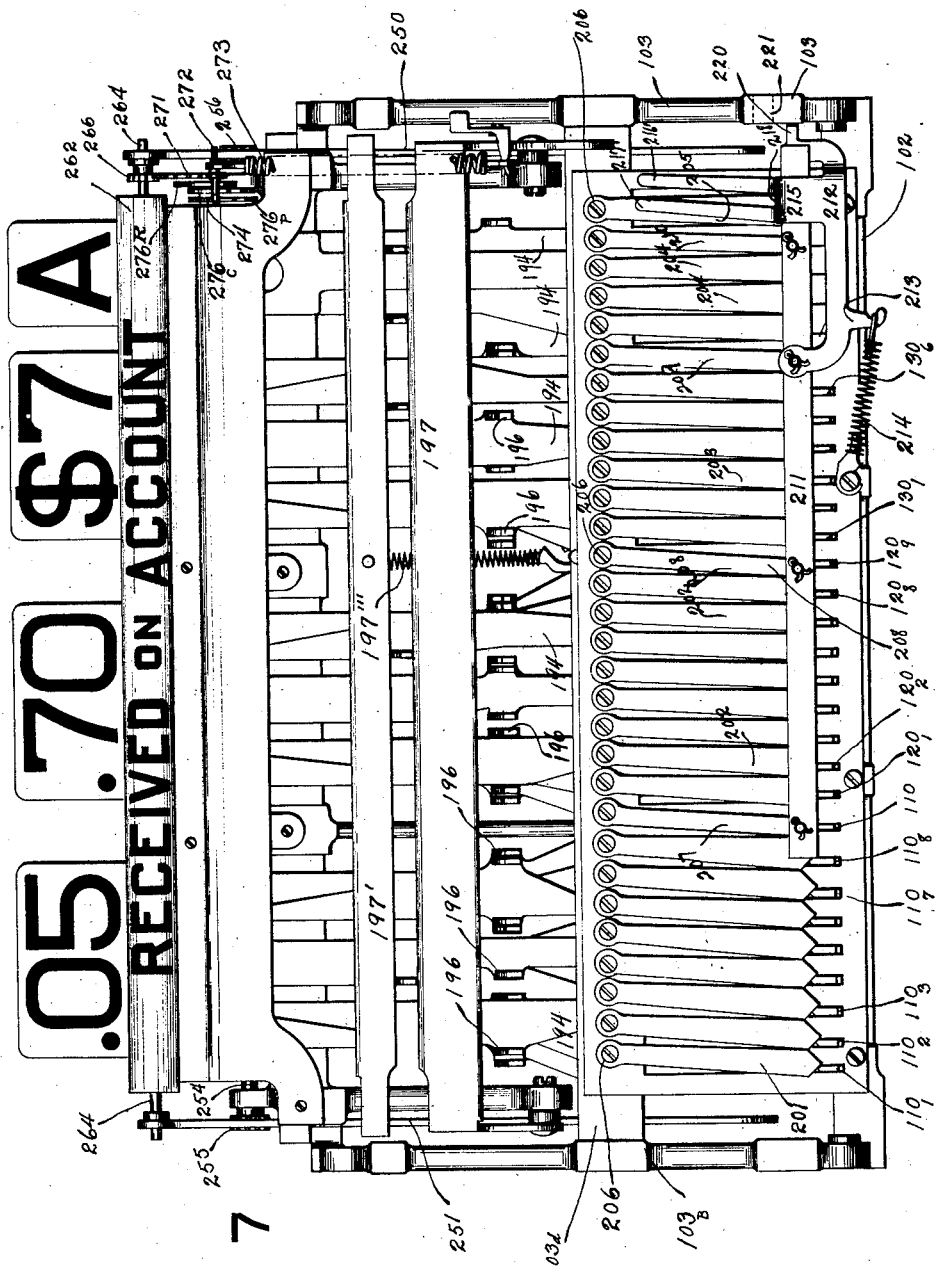
Fig. 7 is a back elevation of the machine with the cabinet removed.

Referring to Fig. 7, it will be seen that the operating keys 110, 120, and 130 extend through the back of the machine for cooperation with a series of pendants 201, 202, 203, 204 and 205, pivoted to the back of the machine as at 206. These pendants serve in the usual way to prevent the operation of more than one key in any group. Nos. 207, 208, 209 and 210 are special hangers located between the hangers of each group. These are pivotally connected in any suitable way to slide 211. Pivotally connected to this slide is a latch 212 which is provided with an arm 213 for cooperation with a spring 214 attached to the frame of the machine for normally holding the latch in position shown in Fig. 7. The latch is provided with an upwardly extending finger 215 provided with forwardly bent spaced hooks 216 and 217 separated by a notch 218 for a purpose to be described hereinafter. To the rear ends of these hooks are attached the fingers 216′ and 217′. The latch is provided also with a head 219 provided with a nose 220 which, as shown in Fig. 7, normally abuts against the side plate 103.

It will be readily seen from the description given that it will ordinarily be impossible to depress any of the transaction or amount keys because their pendants are locked against oscillation by the engagement of the nose 220 with the side plate. The pendant 205, however, is not locked, and will permit the operation of one of the clerks' keys, 140_A or 140_B. Referring to Fig. 8, the depression of one of the clerks' keys, as 140_A will result in the lifting of the latch 212 on account of the engagement of the key with the hook 216. When the limit of this motion is reached by the engagement of the latch 212 with the slide 211 the clerk's key is locked against further movement and the nose 220 is oposite the aperture 221 in the side plate. This serves to unlock the pendants with the result that any of the other keys may be operated. The initial movement of any other key will cause the slide 211, to move toward the left of the machine or to the right in Fig. 8 permitting the nose 220 to penetrate the aperture in the side plate. The latch, being attached to the slide 211, is also moved to the left with the result that the clerks' key is freed from the hook 216, and may continue its upward movement, as shown Fig. 9, between the fingers 216' and 217'. These fingers prevent the keys getting on top of the hooks 216 or 217 on their downward stroke on account of the nose 220 getting out of the aperture 221 when a clerk's key is depressed.

I have found this to be a very satisfactory means for accomplishing the desired results but it is to be understood that it constitutes only one embodiment of my invention, and that other forms of the invention may be used. For example, I have shown in Figs. 10 to 13 inclusive a similar construction for accomplishing the same results. In this form of the invention I have dispensed with the special pendants 207, 208, 209 and 210 and the slide 211 and the latch 212 and used in place of those parts a locking plate 230 extending across the back of the machine and provided with upwardly bent ends 231 and 232 pivoted to the side plates in any suitable way. The plate is normally held in the forward position by a spring such as 232'. The lower edge of the plate, designated by the numeral 233, is so positioned as to overlie the transaction and amount keys and therefore prevent their operation as shown more clearly in Fig. 11. Opposite the clerks' keys the plate has a portion 234 which extends further backward and downward than the main part of the plate and abuts against the end of the clerks' keys. Immediately above the clerks' keys the plate is provided with a forwardly extending tongue 235 which may be engaged by the clerks' keys for rocking the plate backward upon their upward motion. Immediately above the tongue 235 is located a stop 236 for terminating the initial movement of the clerks' keys as shown in Fig. 12.

The operation of this device is as follows: The transaction and amount keys are locked against operation by the engagement of the ends of the keys with the lower edge 233 of the locking plate. The clerks' keys, however, are not locked. The depression of one of these keys will oscillate the pendant 205 which will serve to prevent the operation of the other clerk's key in a manner well understood. The upward motion of the clerk's key will, on account of its engagement with the tongue 235, rock the locking plate backward until the motion of the clerk's key is terminated by engagement with the stop 236. This rocking of the locking plate, as shown in Fig. 12, releases the amount and transaction keys for operation. The depression of any one of these keys will, on account of their engagement with the forward angular face of the locking plate, rock said plate still further which will result in unlocking the clerk's key, permitting it to make a full stroke.

*Flexible key coupler:*—As is usual in such machines, I have provided a key coupler 222 extending across the machine above the rear part of the keys for coupling the actuators to act as a unit and to restore the key levers to normal position at the close of the operating cycle. The coupler is pivoted to the machine side frames in any suitable way for oscillation by the keys. A rigid block 224 is mounted upon the coupler near its back edge 223 in line with the two clerks' keys, $140_A$ and $140_B$. The coupler carries flexibly mounted plates 225, $225_2$, $225_3$, $225_4$, one for each bank of keys. These plates are pivotally carried by the series of brackets 226, secured by screws to the top of the coupler body, and are adapted to be engaged by the key levers (see Figs. $1^b$ and $1^c$). A spring 227 between each plate and the coupler body urges it towards its rearmost position in which position it is stopped by the small bent finger, engaging the top surface of the coupler, as shown in Fig. 2, and more clearly in Fig. $1^c$. One end of each flexible plate carries an upstanding curved finger $228_1$, etc. the upper end of which extends close to the fixed frame bar $103_B$ and is adapted for engagement, under certain conditions, with the surfaces 229 and 229' thereof as presently explained.

The operation of these parts is, as follows: When a clerk's key is depressed to 4½ degrees, the distance initially permitted by latch 212 (Fig. 8) lifts the coupler so that the edge 223 and the block 224 enter the notch in the clerk's key and the parts remain temporarily in this position. The depression of a key in any of the other banks will now result in the forcing forward of the corresponding flexible plate until the key is depressed to 4½ degrees when the plate will rock rearward into the notch of the operated key so that such key thereby becomes hooked to the coupler. When the desired number of keys have been thus hooked to the coupler a full depression of any one of them will result in the further lifting of the coupler and the complete depression of all of the other partly depressed keys, as will be readily understood. When all the selected keys have been depressed to the full 4½ degrees and thereby fully latched onto their respective flexible plates, the fingers 228 will be clear of the face 229' on the back frame. If, however, one of such keys has not been fully latched to the coupler, the arm 228 will strike the surface 229 and thereby obstruct further motion of the coupler. The coupler can, therefore, not be raised further unless all keys are in a normal position or are hooked to the coupler. If an attempt is made to attach a key to the coupler after the attached keys have been depressed slightly more than 4½ degrees the finger 228 will be obstructed by encountering the groove 229.

*Combined transaction indicator and flash.*—As part of my novel cash registering machine, I have devised a transaction indicator so constructed and so located with respect to the indicator targets as to perform the function of a flash, i. e., to conceal the exposed targets until the operation is completed. For this purpose I have provided two vertical indicator-support slides 250 and 251 located on opposite sides of the machine and provided with forwardly extending tails 252 resting on the key coupler, see Figs. 7, 14 and 15. These slides will be lifted by the coupler at every operation of the machine. In order to insure simultaneous movement of the slides, to prevent the wedging of the parts, I have provided a shaft 254 extending across the machine having pinions 255 and 256 at its opposite ends cooperating with the rack teeth 257 on the indicator-support slides 251 and 250 respectively. The slide 250 is provided with a nose 258 forming a stop for a purpose to be described hereinafter. The upper ends of the indicator-support slides 250 and 251 are bifurcated to provide arms 259. Two rotatable transaction indicator bars 261 and 262 are supported by suitable shafts 263 and 264 in bearings in the arms 259. These shafts carry the pinions 265 and 266 respectively, in continuous engagement with the gear sector 271. The indicator bars may have any desired number of faces provided with suitable indicia. In this particular case I have formed the indicator bars with four faces bearing the words "Cash", "Received on account", "Charge" and "Paid out". The words are so arranged on the faces of the bars that the same indication is displayed at the front and back of the machine. It will readily be seen that in order to display any desired index it will be necessary merely to properly position the gear sector 271.

I will now describe the means I have provided for this purpose. In the same group as the "A" and "B" indicator tablets I have provided three slides $275_p$, $275_c$ and $275_r$ of different lengths as can be readily seen in Fig. 14. (See also Fig. 4.) These slides have their lower ends off-set as customary in this art so that they are located over their respective "Paid out", "Charge", and "Received on account" keys and so that they will be lifted to a varying extent by their respective keys. Each of the slides is provided with an appropriate tongue for supporting it, when lifted, upon the top edge of the supporting bar 197. These tongues are similar to the tongues 196 on the indicator stems described heretofore and are not shown in great detail because their construction and operation will be understood by those skilled in this art. The tops of these slides are provided with rearwardly extending shelves 276P, 276R, and 276C at about the same elevation. The gear sector 271 has a pin 274 extending toward the right and overlying these shelves and is provided on the left with a pin 272 which serves as an attached means for the spring 273 but extends further to the left for engagement with the stop 258. When keys are depressed for a cash operation, the slides and their attaching parts are lifted by the motion of the key coupler so that the indicator bars 261 and 262 will conceal the targets which would otherwise be exposed to view. When the coupler drops, the slides and their attached parts descend by the action of gravity and the force exerted by the spring 273. The parts come to rest with the pin 272 on the stop 258, it being understood that the shelves 276 have not been raised. The indicator bars will now expose the word "Cash" on the front and back of the machine.

A paid out operation is as follows: The depression of the keys raises the coupler and therewith the slides and their attached parts as in the previous instance. The "Paid out" key however, has lifted the slide 275P which is held in elevated position by the back rod so that the shelf 276P is in raised position. When the indicator parts descend the pin 274 strikes the shelf or stop 276P, and upon the further descent of the parts, the gear sector 271 is rotated to the right, so that the indicator bars are turned 270 degrees, exposing the words "Paid out", on opposite sides of the machine. The length of the other slides 275C and 275R is such as to position their respective shelves for rotating the indicator bars 90 degrees and 180 degrees respectively, from the normal ("Cash") position. I have found it desirable to construct the indicator bars with concave faces so that the words on the top and bottom of the bars cannot be readily seen, but it is to be understood that plane or convex surfaces may be used and that the number of faces on the bars may be varied at will, so that other and additional indicia associated with corresponding operation controlling devices may be used if so desired.

*Totalizers.*—The present machine is provided with two totalizers to register separately the sales of two clerks, or of two departments, or two classes of goods. These totalizers I have designated by the letters A and B. The upper counter is thrown into mesh when the A key is operated, and the lower counter is thrown into mesh when the B key is depressed. These counters are pivotally mounted in a frame, consisting of the frames 290 and 291. Special means is provided for rocking the counters into and out of mesh with the registering segments at specified times.

The counters are shown in detail in Figs. 16 to 23, and comprise two parallel horizontal shafts 300 and 301 mounted in any suitable frame 301'. Referring to Fig. 22, it will be seen that the shaft 300 carries seven counter wheels. The pennies, dimes, and dollars wheels are directly actuated by their respective segments 157, 167 and 177. The shaft 300 carries seven counter units $302_1$ to $302_7$, each of which comprises a pinion 303, a transfer disc having a trip tooth 304 and a type wheel 305. The shaft 301 carries six transfer spools one of which is shown in perspective in Fig.

18. These spools consist of a retaining square 306, a spider 307, a barrel portion 308 and a star wheel 309. These spools are so arranged on the shaft 301 that the spider 307 is opposite the transfer tooth 304 and the star wheel is opposite the pinion of the next higher unit. The shaft 310 is supported by the frame of the counters parallel to the shaft 300 and 301 and carries a series of retaining pawls 311 each provided with adjacent notches 312 and 313. These pawls are aligned with and spring pressed against the retaining square 306 of the transfer spool. Pivotally mounted on the segment shaft 105 are six transfer arms 314 in line with the star wheels 309 of the various spools. The forward ends of these arms are arranged practically concentric with the segment shaft and are provided with two notches 315 for a purpose to be described hereinafter. The back ends of these transfer arms are bifurcated and carry oppositely extending studs or rollers 317 and 318 respectively bearing on cams 319 and 320, carried by the shaft 106. As seen in Fig. 4 and Fig. 19 and Fig. 24, these cams are spirally arranged around the shaft so that the transfer arms will be successively depressed. The operation of the parts described is as follows: During the first four and one half degrees of movement of the key the proper counter is rocked into mesh with the segments. The continued motion of the keys allows the segments to rotate their respective counter wheels a number of spaces corresponding to the value of the key operated. During the last part of the down stroke or, if desired, during the first part of the up stroke the counter is rocked out of mesh so that the transfer, which must occur when the counter is out of mesh, will be effected during the remainder of the up stroke.

In Fig. 16 the counter wheel is shown in the "9" position. A corner of the square 306 is positioned in the notch 313 of the holding pawl. In this position the teeth of the star wheel are not in engagement with the pinion of the next wheel, and, therefore, do not interfere with the actuation of the next wheel by its segment. The transfer tooth 304 is so located that the next depression of a key of its bank will result in partly turning the transfer spool. During this movement the transfer tooth strikes an arm of the spider and turns the spool far enough to shift the corner of the square from the notch 313 to the notch 312 as shown in Fig. 17. It will be seen that this rotation of the spool has brought a point of the star wheel partly into the notch 315 so that when the transfer arm is brought down by its cam it will carry the tooth around to the position shown in Fig. 20, which is 90 degrees beyond the position shown in Fig. 16, so that the spool is again in normal position with the next corner of the square in the notch 313. The front face of the transfer arms has been cut away as at 314' to provide clearance for the pinions when the counters are rocked into mesh. This provides the cam face 316' for restoring the star wheel to normal in case it should have been carried too far in the transferring operation.

In the meantime, however, the tooth of the star wheel following the tooth actuated by the transfer arm has engaged the pinion of the next higher section and has advanced its type wheel one space. As will be obvious to those skilled in the art this construction and operation will result in the addition of "1" to the wheel of next higher order whenever a wheel of lower order passes beyond "9".

Mounted also on the shaft 310 is a series of holding pawls 321 provided with noses 322 lying between the teeth of the pinions of each unit. These are spring pressed forwardly by means of a spring 321' which preferably also serves to force the retaining pawl 311 against the square. These holding pawls besides retaining the totalizer wheels in said position when the totalizer is disengaged from the actuators also assist in preventing overthrow of the counter wheels due to momentum, after they have been operated by their segments, and also to properly align the various type wheels to obtain a better result in printing totals. The holding pawl of the third unit is provided with a projection 322' which will serve to print the decimal point between dollars and cents when the total is printed. These holding pawls perform another function which is quite important, namely, to prevent overthrow of a wheel which has been moved by the transfer mechanism. To this end these pawls are provided with a rearward extension having a cylindrical face 323. Mounted on the shaft 301 is an arm 324 provided with a nose 325 in line with the extension of the holding pawl. The other end of the link is provided with a stud 326 located in the notch 315 of the transfer arm. Normally the transfer arms hold this link in the upper position as shown in Fig. 16 and Fig. 17. However, when the arms descend to cause a transfer the nose 325 will engage the cylindrical face 323 and thereby hold the nose 322 in a forward position locking the transferred wheel against overthrow due to momentum. This locked position is shown in Fig. 20 and Fig. 21.

*Resetting mechanism.*—As part of my improved registering machine I have provided a device for quickly and easily restoring the counters to zero position. The shaft 300 is pivotally and slidably carried by the frame and is held to the left by the spring 332. The knurled head 331 is preferably provided to slide the countershaft to the right against the tension of this spring. The shaft is provided with notches 335 co-acting with the pawls 336 pivotally mounted in the type wheels as at 337, and spring pressed toward the shaft by the spring 338 bearing against an abutment 339 which is a U-shaped plate held in position by the pivot 337. These pawls normally ride on the unnotched portion of the shaft, but when the shaft is slid to the right these pawls will drop into their respective notches. If the shaft is now rotated in a counterclockwise direction as viewed in Fig. 23 the counter wheels will be rotated to zero position. This rotation is stopped at the proper point by the engagement of the teeth 304 with the ends of an arm on the spiders 307. The overthrow of the last wheel is prevented by the engagement of its transfer tooth with a finger 307′ carried by the last transfer arm 324₇.

I have provided a convenient means for causing the rotation of the shaft 300 for resetting, which consists of a resetting segment 333 pivoted on the shaft 105, as shown in Figs. 1, 4, 23 and 24, and is provided with an upwardly extending handle 333′. The shaft 300 carries a pinion 330 which is normally not in line with the segment 333. However, when the counter shaft is slid to the right, the pawls 336 will be enabled to drop into their respective notches and the pinion 330 will mesh with the segment 333. The handle is now grasped and drawn downward with the result that the counter wheels are returned to zero position.

The frame 301′ carries a rigid pin 340 which is normally located in an opening 341 in the pinion 330 (Fig. 22). As soon as the handle is drawn downward, the opening 341 is no longer in alignment with the pin and therefore the shaft is held in its resetting position until the resetting segment is returned to home position. In order to permit the engagement of the pinion with its segment only when the segment is in its home position I have provided an enlarged tooth 342 engaged in a wide notch in the segment. It will be seen that the pinion cannot engage the segment except when this wide tooth is in alignment with the enlarged space of the segment.

*Totalizer control.*—I have provided a novel selecting means actuated by the operating mechanism for bringing different sets of totalizer wheels into operative relation with the actuating mechanism. When the "A" key is depressed the "B" totalizer should not be brought into operative relation with the actuators and vice versa. It is, therefore, necessary to provide selective means effective upon an operation of the machine for establishing a cooperative relation between the actuating mechanism and any one of the totalizers. Certain transactions, such as "Paid out" and "Charge" do not involve the receipt of cash, and while, in such cases, the amount should be printed on the detail strip, and therefore it is necessary to actuate the proper amount keys, it is nevertheless, not desirable to have the amount inserted into either totalizer. I have, therefore, provided means to disable the selecting means of the clerks initial keys in the form of keys or levers to neutralize the effect of the selecting devices. Thus, in the embodiment shown in the drawings when either the "A" or "B" key has been depressed and the "Charge" or "No sale" key depressed neither totalizer will be thrown into mesh with the actuating segments. This construction is shown in Figs. 4, 24, 25 and 26. The rotation shaft 106 carries a double cam 350 upon which bear the studs 351 and 352 carried by the arm 353 pivotally mounted upon a transversely extending shaft 354. Mounted upon this shaft and riveted to the arm 353 is a bail 353′, the inner end of which is provided with an arm 353″ in the end of which is mounted a long stud 355. As stated before, the counters are so mounted between the cross frames 290 and 291 as to permit of their being rocked into engagement with the registering segments. In order to effect this rocking of the counters I have provided two counter control slides 356ₐ and 356ᵦ having notches 357ₐ and 357ᵦ at their lower ends and notches 358ₐ and 358ᵦ at their upper ends. The lower notches embrace the stud 355 and the upper notches embrace the shaft 375 of the detail printer to be described hereinafter.

The slide 356ₐ is provided with a cam slot 359ₐ in which the end of the counter shaft 300ₐ is received. The "B" slide is provided with a similar slot 359ᵦ to receive the countershaft 300ᵦ on the "B" counter. These cam slots are so shaped as to rock the counters into and out of mesh when the slides are moved longitudinally. The slides 356ₐ and 356ᵦ are provided with short studs 360ₐ and 360ᵦ respectively. These studs are received in cam slots 362ₐ and 362ᵦ of the cam plates 361ₐ and 361ᵦ respectively, pivotally carried by the stud 355. The cam slots are not concentric with this stud and therefore the relation between the stud 355 and the counter control slides will depend upon the position of their respective cam plates.

At the very beginning of the key stroke the cam 350 will cause the arm 353″ and its attached stud 355 to be depressed. If the cam plates were to remain in the position shown in Fig. 25 both control slides would be drawn downward with the result that both counters would be thrown into mesh. If one of these plates were rocked rearwardly, however, it would change the relation between the stud 355 and its slide sufficiently to neutralize the movement of the stud so that its slide would remain stationary and its counter not be rocked into mesh.

I have therefore provided a set of keys or levers adjustable as a preliminary to an operation of the machine to predetermine the totalizer to be actuated.

I will now describe the means I have provided for rocking the cam plates at proper times to effect this result. The cam plates are provided with studs $363_a$ and $363_b$ received in slots $365_a$ and $365_b$ formed in the control arms $364_a$ and $364_b$ respectively. These control arms are pivotally carried by the transversely extending shaft 366. Also mounted upon this shaft are the bails $367_a$ and $367_b$ rigidly attached to the arms $364_a$ and $364_b$. These bails are held in rearwardly rocked position by any suitable means such as springs $371_a$ and $371_b$. As shown more especially in Fig. 24 and Fig. 25 the shaft 366 also carries a number of throw out levers $368_a$, $368_b$, $368_c$, and $368_p$ mounted adjacent the keys $140_A$, $140_B$, $140_C$, and $140_P$ respectively. These keys are provided with studs $370_a$, $370_b$, $370_c$, and $370_p$ cooperating with the throw out levers 368. The lever $368_a$ is provided with a nose $369_a$ located for engagement with the bail $367_b$ (Fig. 24). The throw out lever $368_b$ is provided with a nose $369_b$ which engages with the bail $367_b$. The levers $368_c$ and $368_p$ are provided with noses $369_c$ and $369_p$ which engage both of these bails. It will be readily seen that upon the depression of any one of these four keys its studs 370 will rock its lever 368 forward with the result that one or both of the bails are tilted upward carrying forward its attached control arm and rocking one or both of the cam plates rearwardly with the result that their respective slides will not be actuated and therefore the related counter is not thrown into mesh. I have therefore provided additional manipulative means for selecting and controlling the engagement and disengagement of the totalizers.

From the foregoing it will be noted that the selection of a totalizer for operation is effected by a process of elimination instead of a direct selection. Thus, under the normal condition of the parts, both of the counter control slides are connected for movement with the shaft 366 so that if the machine could be operated without the depression of a clerk's key or a transaction throwout key both counters would be engaged with the actuators. In order to select merely the A totalizer, for example, key $140_A$ will be depressed and, through the connections mentioned, will serve to neutralize the movement of the shaft 366 as far as the slide $356_b$ is concerned while the action of shaft 366 on the slide $356_a$ will not be disturbed. However, if a special key, such as $140_P$ is depressed, it will act through both sets of the connections, mentioned, to neutralize the action of shaft 366 with respect to both of the counter control slides. Thus if only one slide has been neutralized by the depression of a clerk's key the totalizer corresponding to the remaining slide will be selected but depression also of a special throw-out key will tend to disable or further neutralize the connections so that neither totalizer will be engaged with the actuators.

*Detail printing type.*—The means I have provided for setting up the type for printing the details on the record strip comprises recording and temporary indicating mechanism in the form of numeral type wheels and special character printing segments. In the drawings the printing and temporary indicating wheels and sectors are mounted on the shaft 375 carried by the counter frames 290 and 291 adjacent to the registering segments 157, 167 and 177 and the segments 187. In mesh with these segments I have provided the pinions $376_1$, $376_2$, $376_3$, and $376_T$ to which are attached the printing wheels, $377_1$, $377_2$, $377_3$, and $377_T$ respectively. The first three of these carry raised type numerals 0 to 9. The type wheel $377_T$ is provided with the transaction symbols "*" "Pd" "Ch" and "Rc" indicating the character of the transaction as Cash, Paid Out, Charge, and Received on account. Adjacent the transaction type wheels I have provided a type segment 378 bearing the letters "A" and "B" to designate the initials of the clerks. The type wheels are rotated according to the degree of motion of their respective segments and the type on the wheels is so located that the figures corresponding to the keys operated will be brought to printing position.

Attached to the segment 378 and surrounding the detail counter shaft 375 is a sleeve 379 bearing a crank arm 380 to which is connected a link 383 by means of a crank pin 381. The lower end of this link is pivotally connected to an arm 384 rigidly connected to the bail 385, pivotally mounted on the shaft 354 (Figs. 24, 25 and 26). Rigidly connected to the bail 385 is an upwardly extending arm 386 provided with a cam slot 387 which receives the stud 388 carried by the "B" key $140_B$. The parts are so proportioned that the A type is normally in printing position. When the B key is depressed, however, as shown in Fig. 26, the bail 385 is rocked on its shaft and draws down the link 383 whereupon the B type is rocked upwardly to printing position.

It is desirable to provide means to align the printing wheels while an impression is being taken therefrom. For this purpose I have shown in Fig. 5 an aligning plate 390 pivotally mounted between the counter frames 290 and 291 on the pivots 391. This plate has aligning fingers 392 each provided with a nose 393 movable between adjacent teeth of the pinions $376_1$, $376_2$, $376_3$, and $376_T$. One of these fingers carries a stud 394 received in a slot 395 in the end of a lever 396 pivoted to the counter frame 291 as at 397. The lower end 398 of this lever bears on a cam 399 carried by the rotation shaft. The parts are so proportioned that when the segments have turned the type wheels to the proper position the cam 399 will rock the lever to force the noses 393 against the pinions to hold the type wheels in alignment while the impression is taken therefrom.

Since the pinions are in mesh with the segments and the counters are also in mesh with the segments the construction performs also the function of stopping the motion of the segments and counters at the end of their movement to prevent overthrow due to momentum.

*Printer.*—I have provided an improved construction for printing the details of the various transactions on a record strip which is so constructed that it is capable of taking an impression from the detail printing wheels just described or from the type wheels of the counters for printing the totals on the record strip. The printer parts are carried by a frame which is pivotally mounted on the segment shaft and can be swung with this shaft as a center so that the printing platen overlies the detail printer or the A or B counters.

The details of the printer are shown more clearly in Figs. 33 to 36 inclusive. The printer comprises side plates 400 and 401, provided with claws 400' and 401', engaging with the segment shaft 105. The side plates are connected by a back bar 402 and tie rods 403 and 404.

The side frames are provided with noses 405 which engage in suitable notches in the back frame of the machine 103$_B$. Extending transversely between the side plates is a platen shaft 406 upon which is supported the platen 407 by means of the arms 408 and 409. The under face of the platen is provided with a rubber cushion 410. Extending rearwardly beyond the platen shaft is the platen tail 411 which is actuated by a hammer for forcing the platen against the type in a manner to be described later. The paper rolls and paper feed mechanism are carried in a separate frame which is pivoted to the side plate 400 on a stud shaft 415 and comprises a U-shaped plate 416 which carries, among other things, a storage roll 417 and a supply roll 418. The supply roll is frictionally held against rotation by any suitable means as by a spring tensioned washer. The plate 416 and its attached parts may be swung around the pivot 415 to an upward position as shown in full lines in Fig. 36. In this way, access may readily be had for replenishing the paper supply, etc. When in home position the plate is supported on a stud 416'' received in a notch 416'. It is held in this position by a latch 416$_1$, pressed into engagement with the stud 416$_2$ by a spring 416$_3$. The storage roll is carried by the shaft 419 rigidly carried by the plate 416 and serves as a pivot for the rocking arm 420, shown more clearly in Fig. 36. The upward extension of this arm carries the paper guide roller 424 and the lower extension carries the supply roll 418 on the shaft 421 and also supports a paper guide roller 422.

Guide rollers 423 and 423' are mounted on the plate 416. The paper passes from the supply roll under the roller 422 under the roller 423 around the roller 423', over the tie rod 404 and the shaft 406, under the platen, around the rollers 425 and 425', over the shield 487, to and around the roller 424 and then to the storage roll. It will be seen that the rocking of the arm 420 will draw the paper around the platen to printing position and back to writing position so that the last impression may be read and notations made opposite it if desired.

The printer is operated by a cam 429 on the rotation shaft, engaging the roller 433 on the horizontal arm 431 of a bell crank carried by the main operating shaft 430 extending across the printer frame. The vertically extending arm 432 of this bell crank is provided with a notch 434 in which is received the stud 435 mounted on the rocking arm 420. An extension 436 may be provided for guiding the stud 435 into the notch 434 when the paper frame is returned to normal position. The cam is rotated one revolution for each operation of the machine and serves to actuate the bell crank, which, in turn, rocks the rocking arm 420 for performing the functions just described. Near the side plate 401 the shaft 430 carries an arm 437 provided with an upwardly extending portion 438 carrying an ear 439 and a handle 440$_A$. This arm is also provided with a nose 441 and a short stud 442.

The platen is actuated by a hammer 443 pivoted to the side frame 401 by a stud 444. This hammer is provided with a heavy head portion 445 and is forced upward by a spring 447 bearing against the lug 448 and guided by the pin 446. The hammer is provided with a pivot 449 upon which is mounted a hammer retracting pawl 450 having a tail 451 bearing against an adjustable stop 454. This pawl is provided with a bent over ear 452 cooperating with the nose 441 of the arm 437. The latch is held in position shown by the spring 453. It will be seen that when the arm 437 is rocked, the nose 441 will bear against the ear 452 of the pawl and thereby retract the hammer against the force of the spring 447. Upon a further movement the nose 441 will clear the pawl and permit the hammer to strike the platen tail 411 causing the platen to force the paper against the type. The spring 458 is provided to normally retain the printing platen in lifted position. Extension 459 of the platen frame normally rests on the upper surface of the tie rod 404 to limit the distance the platen may be raised under the influence of spring 458. The arm 411, which is rigidly attached to the platen carrying frame is provided with an arcuate portion 476 which is concentric with the shaft 430 and with a notch 477 in front of the circular extension. The ear 439 on the arm 437 overlies this circular extension and locks the platen in normal position, so that the pressure exerted in writing on the record strip will not force the platen against the type and cause an incorrect record. When the arm 437 is moved forward the ear 439 clears the circular portion and arrives opposite the notch 477. This unlocks the platen and permits it to be actuated by the hammer.

The storage roll 417 is provided with a ratchet wheel 461. The arm 420 carries an operating pawl 462 held in engagement with the ratchet wheel 461 by means of a spring 462'. Pivoted to the plate 416 as at 459 is a retaining pawl 460. It will be seen that when the arm 420 is rocked forward about the shaft 419 the storage roll will be held stationary by the pawl 460 and the operating pawl will be moved to engage the next tooth on the ratchet, and on the return movement will cause the pawl to rotate the ratchet and the attached storage roll one step forward. It is highly desirable in a machine of this type to have as much as possible of the work done during the down stroke of the keys as there is very little energy available on the up stroke. The paper supply roll is frictionally held against rotation to keep the paper properly tensioned and it will, therefore, require considerable force to unroll the paper between operations for securing the proper line spacing. With the arrangement shown the work of unrolling the paper for feeding is done on the down stroke, the result desired. As described above, the storage roll is stationary on the down stroke of the key and is turned on the up stroke by the pawl 462. While this is true, the work of unrolling a length of paper from the supply roll is done when the storage roll is stationary (down stroke of the key) because the guide roll 424 rocks forward and in so doing rolls a short length of paper on the storage roll. At the same time, the guide roller 422 swings downward and rearward and draws an equivalent length from the supply roll.

In order to permit of the manual feeding of the paper I have provided a feed lever 463 pivoted to the plate 416 at 459 and provided with a hook shaped pawl 464 engaging the ratchet 461. The spring 465 is connected to the pawls 464 and 460 and serves to hold them in engagement with the ratchet. A spring 466 is provided for holding the feed lever normally in rearward position.

*Inking ribbon.*—The endless inking ribbon 480 passes over the inking spool 481, formed as an inking pad for supplying the ink continuously to the ribbon, between the paper and the type to the other side of the machine where it is looped around a tightening pully 482 carried by the arm 483, pivotally carried by the frame and tensioned by the spring 484. The upper strand of the ribbon is guided by the guide rollers 485 and 486. The shield 487 is located between the ribbon and the paper and serves as a writing platen when notations are to be made upon the record strip. The spool 481 is actuated step by step by the pawl 488 carried by the bell crank 489 pivotally mounted on the side frame 400. The horizontal portion of the bell crank is bifurcated to provide a slot 490 to receive the stud 491 on the arm 432.

The operation of the printer is as follows: During the down stroke of the keys the cam 429 is rotated 180 degrees whereby the arm 432 is rocked forward causing a similar motion of the rocking arm 420. The paper guide roller 422 carried by the arm 420 is moved backward and downward with the result that it draws the paper around the platen from approximately writing position to printing position, in the present machine a distance of about one and one-quarter inches. The roller 424 is moved forward to provide the necessary length of paper for this purpose. In the meantime, the arm 437, which is carried by the shaft 430, is moved forward to unlock the platen and retract the hammer. Furthermore, the segments have rotated the detail printer wheels to proper position so that when, at practically the end of the down stroke, the hammer actuates the platen, the proper impression will be made on the record strip. During the up stroke of the keys the parts are rocked back to normal position. The roller 424 draws the paper around the platen to writing position. The pawl 462 had, however, turned the storage roll the space of one tooth causing a greater motion of the paper on the return stroke, one and one half inches in the present machine. The difference between these motions (one quarter inch) permits of a line space of one quarter inch between successive items on the record strip. During the return stroke the nose 441 is permitted to clear the ear 452 on account of the resiliency of the spring 453. It will be apparent that the motion of the arm 432 will, through the parts 491, 490, 489 and 488, cause the advancement of the inking ribbon step by step at each operation of the machine.

*Total printing.*—The counter frame 290 is provided on its right side with cam grooves 494 and 495 (shown in Fig. 24 and Fig. 34) for receiving the guide stud 442 when the totals are to be taken. In order to take the total of the B counter, the handle 440B, rigidly connected to the printer frame, is drawn forward with the result that the printer frame is rocked around the segment shaft until the platen is located opposite the type wheels of the B counter as shown in Fig. 38. During this forward rocking of the printer frame, the stud 433 has been lifted from the cam 429 and the stud 442 has entered the cam groove 495, which is eccentric to the shaft 105, with the result that the arm 437 is rocked forward to the same extent as it had previously been rocked by the cam 429. The cam groove 495 is so proportioned that the platen will be actuated by the hammer when it is opposite the type wheels of the B counter so that the total accumulated thereon is printed on the record strip.

When it is desired to print the total of the A counter the handle 440$_A$ is grasped and drawn downward. The stud 442 will now enter the cam groove 494 which is shorter and more eccentric with relation to the shaft 105, than is the groove 495, with the result that the shaft 430 will be actuated sufficiently far to cause the tripping of the hammer when the platen is opposite the type wheels of the A counter, so that the total accumulated on the A counter is printed on the record strip.

The ends of the grooves 495 and 494 serve to stop the printer in the proper position for taking the totals from the respective counters.

*Special counters.*—In a machine of this kind it is often found desirable to provide counters to register the number of times certain operations and transactions are performed. In the present machine I have provided seven special counters assembled in a single unit so that they may be easily removed from or inserted into the machine. To this end I have provided a special counter frame consisting of side plates 500 and 501 (Fig. 30) connected together by tie rods 502. This frame is attached to the back frame of the machine 103$_B$, (Figs. 1, 1$^a$ and 31) by means of a pin 503 extending through a lug on the back frame. Extending between the side plates are seven shafts 505 upon which are mounted the totalizer wheels of the seven special counters, consisting of a "Reset" counter indicating the number of times the locking mechanism has been moved to reset position; a "Customer" counter indicating the number of times the machine has been operated; a "Paid out", "Charge", "Received on account", and "No sale" counters, registering the number of these transactions and a "B" counter to register the transactions made by the clerk B. The difference between the customer counter and the "B" counter represents the number of transactions made by the clerk A. The construction of the various counters is substantially the same, and for this reason it will be sufficient to describe merely one of them. The customer counter consists of the shaft 505$_C$ carrying the totalizer wheels, each of which is provided with a ratchet wheel 509. Pivotally mounted on the shaft 505 is a crank arm 506$_C$ formed preferably as a bail which carries the shaft 507$_C$ carrying an operating pawl formed with four prongs of progressively increasing lengths. This shaft projects beyond the bail and serves as a connection for the counter operating arms to be described hereinafter. The counters may be of any desired construction, and in the present case I have employed a suitable transferring mechanism such as the "deep notch" transfer, as for example such as is shown in U. S. Patent No. 1,005,592 to Bradford. The holding pawls 508' are held against the ratchet wheels by springs 510 and serve to prevent the backward movement of the counter wheels. The "Reset" counter is operated by an arm 511 which is described in detail hereinafter. The rotation shaft 106 is provided with a cam 513 actuating the arm 512 of a bell crank, the vertical arm 514$_C$ of which is slotted to receive the pin 507$_C$ of the customer counter. It will be seen that the arm 514$_C$ will be oscillated at every operation of the machine for registering the number of times the cash register has been operated. The remaining counters are operated by a series of arms 514 extending from cam plates which are pivotally carried on the segment shaft 105. These plates are each provided with a cam slot 515 receiving the studs 516$_B$, 516$_P$, 516$_{Ch}$, 516$_{Rc}$, and 516$_N$, carried by the B, Paid out, Charge, Received on account, and No sale keys, respectively (Fig. 4). It will readily be understood that on each operation of any one of these keys the corresponding plates will be rocked rearwardly resulting in the addition of one to the proper counter.

The counter wheels may be covered by a suitable plate 517 carried by the counter frame and provided with properly spaced slots 517' through which the totals appearing on the counters may be read. It is desirable also to have the words Reset, Customer, B, Paid out, etc. appear adjacent the proper slots in the plate. In order to reset the counters to zero I have provided a series of seven knurled reset wheels 518 (Fig. 31) projecting through proper slots 517'' in the plate 517 and serving to return the counter wheels to zero in any desired manner. In order to give access to these counters, the cabinet is provided with an opening in line therewith. This opening may be covered by any suitable lid 519 provided with a keeper 520, which may be locked by the latch 521 carried by the shaft 366. The means for retracting the latch will be described later.

*Bell mechanism and muffler (see Fig. 32).*— In machines of this kind it is desirable to provide an alarm mechanism, such as a bell, to call attention to the fact that the machine is being operated. For this purpose I have provided the bell 524 mounted on the inside of the left side plate of the machine on a stud 524'. The striker 525 is pivotally carried by the stud 525'. The striker is provided with a tail 526 lying in the path of a wiper or cam 527 mounted on the rotation shaft 106, and is properly tensioned by a spring 530. It will be evident that during each operation of the machine the cam will retract the striker against the tension of the spring 530 and at a predetermined time, the tail 526 will be permitted to drop off the cam, allowing the striker to come into contact with the bell.

In order to permit operation of the machine without ringing the bell, it may be desirable to provide a bell muffler which may comprise a lever 528 pivoted on the bell stud 524' and having a terminal projection 529' which may be moved manually into the path of the hammer 525 by means of the projecting handle 529. This lever is frictionally retained in any set position.

*Locking mechanism (see Figs. 27, 28, 28ª and 29).*—In machines of this kind it is usually the practice to provide a number of locks so that certain operations may be made and access had to certain parts of the machine by authorized persons only, who are provided with keys for these locks. I have provided a mechanism for obtaining these results by the use of only two locks. One of these locks controls the main lid of the machine while the other controls the main lid, the lower lid and the special counter lid, and also controls the manner in which the machine is to be operated, whether with closed drawer, or open drawer, and permits of the complete locking of the register, or the release of the drawer without operating the machine, and the printing of the totals and resetting the counters.

To accomplish these results I have provided a locking lever 550 pivoted on the segment shaft 105 and provided with a forwardly extending arm 551 formed with a cam 552 having a depressed portion 553 for a purpose to be described later. This lever also supports a geared segment 554. The upper end of the lever is provided with a sector arm 555 provided on its lower edge with notches 556 engaged by a pivoted spring pressed retaining pawl 557. Attached to the inside of the cabinet, as by screws 559, is a bracket 560 supporting the lock 561 provided with a bolt 562 slidably mounted in apertures in the downwardly bent ears 562'. The bolt may be engaged in one of the three holes 563.

The barrel of the lock is provided with a bell crank, the shorter arm of which, is connected to the bolt 562 and the longer arm has a circular portion 579 received in the slot in the end of a lever 580, mounted on the segment shaft 105. This lever is provided with a forwardly extending arm 581 having an ear 582 located adjacent the projection 583 rigidly connected with the key coupler. In the position shown the projection 583 will clear the ear 582, but whenever the machine is not properly locked up, by the entry of the bolt into one of the holes 563, these parts will be so displaced by the arm 579 that the ear 582 will interfere with the projection 583 and prevent the operation of the machine. Mounted on the key shaft 104 adjacent the right side frame is a gear sector 585 in mesh with the sector 554. Fastened to the sector 585 is a somewhat larger gear sector 586 in mesh with a gear sector 587 fast on the shaft 354. Near the center of the machine this shaft carries a cam plate 588 provided with a notched portion 589 and a nose 590. Pivoted to the base of the machine as at 595 is a drawer catch release lever 596 provided with a rearwardly extending hook 597 and an upwardly extending hook 598 adjacent the key coupler. To the front of the pivot 595 the lever carries an upwardly extending pawl 599 pivoted thereto at 600 and provided with a tail 601 bearing against a pin 602 carried by the lever, 596. As is shown in Fig. 28, this pin is of considerable length for a purpose to be described later.

The locking lever 550 is provided with a handle 576 extending through and slidable in a slot in the cabinet and provided with a pointer 577 movable over a scale 578 bearing, at proper points, the words, "Drawer release", "Total and reset", "Closed drawer", "Open drawer", and "Lock register", and shown more clearly in Fig. 28ª.

When the locking lever is oscillated to the lowest position the register is locked against operation. In the next position it may be operated with the drawer open. In the third position it will be necessary to close the drawer before the next operation can be performed. In the fourth position the main lid, lower lid, and special counter lid, will be unlocked, permitting the totals to be printed and the counters to be reset. When the lever is moved to the fifth position the cash drawer will be automatically released.

The key coupler 222 is provided with a downwardly extending arm 604 in line with the pawl 599 which is held forward in the path of the arm 604 by a spring 603. The drawer catch 605 is pivoted to the base of the machine as at 606 and is provided with a notch 607 against which bears the bracket 608 carried by the spring pressed cash drawer. The spring 609 is connected to the catch 605 and lever 596.

The operation of this part of the machine is as follows: On the down stroke of the keys the coupler is moved upward and the arm 604 forces the pawl 599 rearward. When the arm clears the pawl, the pawl will swing forward into the path of the arm. As the coupler descends on the up stroke of the keys, the arm 604 strikes the pawl 599 thereby rocking the lever about its pivot and causing the hook 597 to clear the catch 605 with the result that the drawer operating spring forces the cash drawer open. Since the lever 596 is no longer supported by the catch, the spring 609 will tilt it up about its pivot causing its hook 598 to over lie the coupler, locking the machine against further operation until the drawer is again closed.

Slidably mounted on the shaft 354 and the pin 595 is the locking slide 615 formed with a slot 616 embracing the pin 595 and a slot 617 embracing the shaft 354.

The slide is provided with a stud 618 extending toward the left into the slot 589 on the cam and with an upwardly extending hook 619 adjacent the hook 598. The lower edge of the slide is designated by the numeral 620 and is formed with a notch 621 for a purpose to be described later.

The parts are shown with the locking lever 550 in "Closed drawer" position. When the lever is unlocked and rocked to its forward position (lock register) the sector 554 will rotate the sectors 585 and 586 in a counter clockwise direction, causing the sector 587 and its attached cam 588 to rotate in a clockwise direction. The cam slot 589 has engaged the stud 618 and forced the slide rearwardly causing the hook 619 to overlie the key coupler and lock the machine against operation.

If the lock lever is now moved rearward one step to "Open drawer" position, the stud 618 will be moved counterforwardly withdrawing the hook from the coupler. In this position the pin 602 will contact the lower face 620 of the slide, and therefore prevent the hook 598 from engaging the coupler when the drawer is open. It will, therefore, be possible to operate the machine without closing the drawer between operations.

If the locking lever is moved to the third place the parts will be as shown in the drawing. The notched portion 621 will be opposite the pin 602 and permit the hook 598 to overlie the coupler and therefore necessitate the closing of the drawer between operations.

If the lever is now raised to the fourth position the cabinet lids and the total printing mechanism will be unlocked permitting the printing of the totals and resetting the counters, in a manner to be described later.

If the locking lever is moved to its fifth or last position ("Release drawer") the nose 590 will have engaged the stud 590' on the lever 596 rocking it about its pivot, releasing the catch 605 and permitting the drawer to open.

No holes are provided for receiving the bolt 562 when the lever 550 is in the fourth and fifth positions and therefore when in these positions it is impossible to operate the machine.

The shaft 366 carries a bell crank comprising arms 625 and 627 carrying studs 626 and 628 respectively. (See Fig. 27 and Fig. 29.) These studs are in engagement with the cam 552 formed integral with the locking lever 550. This cam is provided with a depression 553 so dimensioned as to cause a slight rocking of the bell crank and its attached shaft 366 at a certain time. As shown, the locking lever is in "Closed drawer" position and it will be evident that if the lever is moved forward to "Open drawer" or "Lock register" the shaft 366 will not be moved from the position shown. When the locking lever is rocked rearwardly to "Total and reset" or "Release drawer" the shaft will be rocked for a purpose to be described hereinafter.

The shaft 366 carries a bell crank comprising a vertical arm 629 (Fig. 34) having a stud 630 and a horizontal arm 636.

The cabinet is provided with a flat lid or writing table 650 hinged to the cabinet at 651 and also with a lower lid 631 hinged to the cabinet at 632. It is desirable to have the locks so constructed that a clerk may be able to open the writing table lid for replacing the record strip but he should nevertheless not be able to open the lid 631 which would give him access to the counters. Therefore, I have provided a locking spider 634 pivoted to the lid 631 at 633. This spider comprises an upwardly extending hook 634', and a rearwardly extending hook 635 engaging respectively a keeper 639 on the upper lid and a keeper 640 secured to the cabinet proper. The hook 634' is somewhat shorter than the hook 635 so that if the spider 634 is rocked a short distance it will permit of the opening of the upper lid, but the hook 635 will not yet have been released from the keeper 640, and will, therefore, not permit of the opening of the lower lid. For the purpose of permitting this partial rocking of the spider a lock 641 having a bolt 642 engaging a lip 643 on the spider may be provided. The travel of the bolt 642 is sufficient to withdraw the hook 634' but not sufficient to release the hook 635. It will be clear that the clerk who is provided with a key for the lock 641 will be able to open the upper lid but cannot open the lower lid. The spider is provided with a nose 644' which will engage the stud 630 and prevent further rocking of the spider.

However, when the locking lever 550 is pushed backward to the "Reset position" the shaft 366 will rotate and rock the arm 629 rearwardly whereby the stud 630 will pass into the notch 644 simultaneously rotating the spider 634 sufficiently far to unlock both of the lids referred to. At the same time, the latch 521 and the arm 522 (see Fig. 28, Fig. 29, and Fig. 31) are rocked to release the latch from its keeper 520 and permit the opening of the special counter lid. The arm 522 actuates the link 523 slidably carried by the pin 503 for the purpose of actuating the reset counter in the special counter frame. This counter will therefore register the number of times the lock lever has been moved to "Total and reset" position.

In the position shown, the foot 637 (see Fig. 29) carried by the arm 636 is in engagement with the pin 638 carried by the printer frame thereby preventing the printing of the totals. When the lock lever is moved rearward as described above this arm will be rocked rearward to clear the pin 638 and permit the printing mechanism to be rocked forward for printing the totals on the record strip.

The means for rotating the rotation shaft 106 is shown in Fig. 29. It comprises the rack plate 650 formed with a slot 651 at its lower end embracing a stud 652 carried by the right side frame of the machine. The upper end of the plate is provided with a large notch or cut-away portion 653 leaving two arms provided with opposed racks 654 and 655 in line with a pinion 656 pinned to the rotation shaft. The rack 654 is provided with a lip 657 adjacent the lug 658 on the right side frame of the machine.

The lower part of the rack plate is provided with a slot 659 receiving a lug 670 carried by the coupler 222, whereby the rack plate will be raised and lowered at each operation of the machine.

To the left of the pinion 656 the shaft carries a collar 671 formed with a notch 672 for receiving the nose 673 on the coupler when in raised position. To the right of the pinion the shaft 106 carries a ratchet wheel 674 upon which bears a pawl 675 pivoted to the side plate at 676 and held against the ratchet wheel by the spring 677. This construction prevents retrograde motion of the rotation shaft and therefore serves as a full stroke mechanism.

Pivoted to the frame as at 679 I have provided an inclined shelf 678 in the path of the rounded end 682 of the rack 655, held against the stop 681 by the spring 680. At the end of the return stroke spring 685 disengages 656 and 655, thereby meshing rack 654 with wheel 656. Thus the reciprocation of plate 650 causes gear 656 to make one complete revolution, and is returned to initial position at the completion of a full operation of the machine.

When the machine is operated the coupler lifts the rack plate which rotates the pinion and shaft 180 degrees on the down stroke of the keys. At the end of this stroke the lip 657 clears the lug 658 and the shelf 678 forces the rack rearwardly against the tension of the spring 685 so that the other rack 655 will engage the pinion. As the rack plate is drawn downwardly the lip 657 passes behind the lug 658 and the shaft is turned through 180 degrees to its home position. As the rack passes from one position to the other the nose 673 holds the shaft against rotation so that the teeth of the rack 655 and the pinion will go into mesh properly.

It will be seen that I have provided a construction which satisfies the objects enumerated above and while I have shown the invention in a certain physical embodiment or embodiments it is to be understood that modifications of the structure shown may be made by those skilled in this art without departing from my invention as expressed in the following claims.

I claim:

1. In a registering machine, a plurality of sets of operating keys, provided with hooks, a coupler common to all of said keys having one edge adjacent said hooks, a plurality of spring pressed plates one for each set of keys, an arm carried by each of said plates cooperating with a stationary abutment, said arms and abutment being so designed and proportioned as to cause any of the arms to engage the abutment when the corresponding plate is displaced from normal position, thereby locking the coupler against further movement.

2. A type carrier comprising a plurality of type wheels, aligning pawls for the type wheels, a type surface formed on one of said pawls for printing any desired mark in connection with the characters on the type wheels.

3. In a registering machine, a totalizer, actuators therefor, and means for bringing the totalizer and actuators together at predetermined times, said means including an extensible and contractible connection, and means set into motion by certain keys for changing the length of the connection so as to neutralize the effect of the first mentioned means and prevent the actuation of the totalizer by the actuators.

4. In a registering machine, a totalizer, actuators therefor, means movable by the machine at each operation thereof for moving the totalizer relative to the actuators for actuation thereby, said means comprising an elongatable device and means under the control of certain keys for causing the elongation of the device to neutralize the effect of the first mentioned means to prevent connection of the totalizer with the actuators when certain keys have been depressed.

5. In a registering machine, a totalizer, actuators therefor, means movable by the machine at each operation thereof for moving the totalizer relative to the actuators for actuation thereby, said means comprising an elongatable device and means under the control of certain keys for causing the elongation of the device to neutralize the effect of the first mentioned means to prevent connection of the totalizer with the actuators when certain keys have been depressed, said neutralizing means comprising cam plates adjacent the keys, actuated by studs on said keys.

6. In a registering machine, a totalizer, actuators therefor, a stud movable by the machine at each operation thereof for moving the totalizer relative to the actuators for actuation thereby, a cam plate carried by said stud and having an eccentric cam slot, a control slide provided with a stud received in said slot and means for rocking the cam plate when certain keys are depressed to hold the control slide stationary by said movement of the cam plate.

7. In a cash registering machine an enclosing cabinet provided with two adjacent lids, a movable member provided with latches for holding these lids in closed position, said latches being so designed that a partial movement of the movable member will disengage one of the latches, and a further movement will disengage the other latch.

8. In a cash registering machine an enclosing cabinet provided with two adjacent lids, a movable member provided with latches for holding these lids in closed position, said latches being so designed that a partial movement of the movable member will disengage one of the latches and a further movement will disengage the other latch, and a lock capable of imparting said partial movement only to the movable member.

9. In a cash registering machine an enclosing cabinet provided with two adjacent lids, a plate pivotally carried by one of the lids and provided with a hook engageable with the cabinet and a second hook engageable with the other lid said hooks being so proportioned that a partial rocking of the plate will disengage the second hook and a further rocking thereof will disengage the first hook from the cabinet.

10. In a cash registering machine an enclosing cabinet provided with two adjacent lids, a plate pivotally carried by one of the lids and provided with a hook engageable with the cabinet and a second hook engageable with the other lid, said hooks being so proportioned that a partial rocking of the plate will disengage the second hook and a further rocking thereof will disengage the first hook from the cabinet and means under control of a lock capable of fully rocking the plate.

11. In a cash registering machine an enclosing cabinet provided with two adjacent lids, a plate having hooks pivotally carried by one of the lids and engageable with the other lid, said hooks being so proportioned that a partial rocking of the plate will disengage the second hook and a further rocking thereof will disengage the first hook from the cabinet, and means under the control of a lock capable of fully rocking the plate and a second lock capable of rocking the plate sufficiently to disengage only the second hook.

12. In a cash registering machine an enclosing cabinet provided with two adjacent lids, a plate provided with hooks pivotally carried by one of the lids and engageable with the other lid, said hooks being so proportioned that a partial rocking of the plate will disengage the second hook and a further rocking thereof will disengage the first hook from the cabinet, and means under the control of a lock capable of fully rocking the plate and a second lock capable of rocking the plate sufficiently to disengage only the second hook and means to prevent the complete rocking of the plate except by the lock controlled means.

13. In a cash registering machine having a shiftable printer for taking impressions from several sets of type carriers a cabinet lid normally latched for concealing said printer, a lock controlled cam, a shaft extending across the machine oscillatable from one position to the other by the cam, said shaft being provided with means for operating the cabinet lid latch and an arm for locking the printer against shifting movement in one position of the shaft.

14. In a cash registering machine having a shiftable printer for taking impressions from several sets of type carriers, a lock controlled cam, a shaft extending across the machine oscillatable from one position to another by the cam, said shaft being provided with an arm for locking the printer against movement in one position of the shaft.

15. In a cash registering machine a normally latched cabinet lid, a lock controlled cam, a shaft extending across the machine oscillatable by the cam, said shaft being provided with means for operating said cabinet lid latch, a counter actuating arm and a counter actuated thereby located beneath said lid, means for actuating the cam to oscillate the shaft, and connections whereby oscillation of the shaft will operate the counter actuating arm and counter.

16. In an accounting machine, the combination of a plurality of totalizers, an actuating mechanism therefor, selecting means effective upon an operation of the machine for establishing a cooperative relation between said actuating mechanism and any of said totalizers, levers adjustable as a preliminary to an operation of the machine to predetermine the totalizer to be actuated, and means comprising levers to neutralize the effect of said selecting means.

17. In an accounting machine, the combination of a plurality of totalizers, of actuating devices for the same, a plurality of key levers associated, respectively, with said plurality of totalizers adjustable to produce a preliminary operation of the machine to control the shifting of a totalizer into operative relation with the actuating devices, and means effective upon the further operation of the machine for actuating said totalizer.

18. In an accounting machine, the combination of a plurality of totalizers, of actuating devices therefor, a plurality of selecting levers corresponding to said totalizers and adjustable to produce a preliminary operation of the machine to effect the shifting of the corresponding totalizers into operative relation with the actuating devices and simultaneously to prevent the shifting of a non-corresponding totalizer into operative relation with the actuating devices, and means effective upon the further operation of the machine for actuating the selected totalizer.

19. In an accounting machine, the combination of a plurality of totalizers, of actuating devices therefor, selecting levers corresponding to said totalizers and adjustable during a preliminary operation of the machine to prevent the shifting of a non-corresponding totalizer into operative relation with the actuating devices, means effective upon such preliminary operation of the machine for shifting the selected totalizer, means to disable the shifting means, and means to restore said adjustable means to normal position at the end of the operation of the machine.

20. In a cash register, the combination with a plurality of totalizers and normally locked key controlled actuators therefor, optionally operable totalizer selecting keys, and means controlled thereby for unlocking the actuators, and means for locking said selecting means in partially operated position until the actuators have been operated.

21. In a cash register, a combination of a plurality of manipulative amount determining means for a plurality of denominational orders, wheel actuators controlled thereby, a coupler associated with said amount determining means, mechanism for raising said coupling means to coupling position, and means for locking said wheel actuators and manipulative amount determining means against operation upon the attempted operation of any additional amount determining means when the coupling means is moved beyond coupling position.

22. The combination with a plurality of totalizers provided with teeth and actuators therefor and a pawl support carrying spring pressed pawls engaging with said teeth, of independent means successively movable into the path of said pawls for arresting movement thereof thereby locking said wheels one after another against operation substantially as described.

23. In an accounting machine, the combination of normally locked driving means for a plurality of totalizers, releasing and totalizer selecting means therefor, a series of special keys and amount determining keys and means compelling an operation of said releasing and totalizer selecting means, comprising a series of normally locked pendants adapted to be released by said releasing and selecting means, as well as operation of one or more of said special and amount keys to render said driving means effective.

24. In a cash register, the combination with multiple totalizers, of totalizer actuating mechanism, a main operating mechanism, adjustable levers for controlling the operating mechanism, means comprising a plurality of links each of which is provided with a cam slot for engaging and disengaging the totalizers and the actuating mechanism and adapted to be reciprocated by the operating mechanism for bringing different sets of totalizer wheels into operative relation with said actuating mechanism.

25. In a cash register, the combination with multiple totalizers each of which is provided with wheels mounted on a shaft, and selecting means therefor, of totalizer actuating mechanism, a main operating mechanism therefor, adjustable levers for controlling the operating mechanism, means comprising a plurality of links; each of said links being provided with a cam slot surrounding a totalizer shaft for engaging and disengaging said totalizers and the actuating mechanism, and adapted to be reciprocated by the operating mechanism for bringing different sets of totalizer wheels into operative relation with the actuating mechanism under control of said selecting means.

26. In a cash register the combination with amount keys, transaction keys, clerks' keys, a plurality of totalizers, actuating mechanism therefor controlled by said amount keys, and means under the conjoint control of the clerks' and transaction keys to render the actuating mechanism ineffective on said totalizers comprising a plurality of links, one for each totalizer for locking the totalizers in disengaged position during an operation of the machine.

27. In a cash register the combination with amount keys, transaction keys, clerks' keys, a plurality of totalizers actuating mechanism therefor controlled by said amount keys, a lever, means under the conjoint control of a clerk's key and at least one other of said keys to render said actuating means effective and a machine lock controlled by said lever to disable all of said controls.

28. In an accounting machine, the combination of a plurality of totalizers, an actuating mechanism therefor, means effective upon an operation of the machine for establishing a cooperative relation between said actuating mechanism and any one of said totalizers including a plurality of connection whose effective length may be varied at will, and levers adjustable to produce a preliminary operation of the machine to predetermine the totalizer to be actuated.

29. In an accounting machine, the combination of a plurality of totalizers, an actuating mechanism therefor, means effective upon an operation of the machine for establishing a cooperative relation between said actuating mechanism and any one of said totalizers including shafts whose positions may be conjointly controlled by a plurality of keys, and levers adjustable by said keys during a preliminary operation of the machine to predetermine the totalizer to be actuated.

30. In an accounting machine, the combination of a plurality of totalizers, an actuating mechanism therefor, means effective upon an operation of the machine for establishing a cooperative relation between said actuating mechanism and any one of said totalizers, including cam controlled shafts on which said totalizers are mounted and whose positions may be controlled by any one of a plurality of sets of special keys, and levers adjustable by said keys during a preliminary operation of the machine to predetermine the totalizer to be actuated.

31. In an accounting machine, the combination of a plurality of totalizers, an actuating mechanism therefor, means effective upon an operation of the machine for establishing a cooperative relation between said actuating mechanism and any one of said totalizers, and levers adjustable to produce a preliminary operation of the machine to predetermine the totalizer to be actuated.

32. In an accounting machine, the combination of a plurality of totalizers, an actuating mechanism therefor, means effective upon an operation of the machine for establishing a cooperative relation between said actuating mechanism and any one of said totalizers, a plurality of levers adjustable to produce a preliminary operation of the machine to predetermine the totalizer to be actuated, and other levers adapted to vary the control of the totalizers by the first mentioned levers.

33. In a registering machine, a key coupler, a plurality of keys arranged in groups and operable to lift the coupler to coupling position, a plurality of plates one cooperating with each group of keys to latch the keys to the coupler, said plates each being pivotally supported at each of its ends on the key coupler, springs normally holding the plates in latching position, and means for retaining the coupler in the coupling position until the desired keys of the several groups are latched thereto.

34. In a registering machine, a key coupler, a plurality of keys arranged in groups and operable to lift the coupler to coupling position, a plurality of plates one cooperating with each group of keys to latch the keys to the coupler, said plates each being pivotally supported at each of its ends on the key coupler, springs normally holding the plates in latching position, means for retaining the coupler in coupling position until the desired keys of the several groups are latched thereto, and a locking arm integral with each plate and cooperating with an adjacent part of the machine to lock the coupler if a key is pressed when the coupler has been lifted past the coupling position.

35. In a registering machine, a totalizer, a set of actuators, an element having an invariable extent of movement at each operation of the machine, an element movable by said first element to effect engagement and disengagement of the totalizer and actuators, one of said elements containing a cam slot and the other carrying a projection engaging said slot, a keyboard, and means controlled by one or more keys for effecting a relative movement of the elements to cause the slot and projection to cooperate to hold the second mentioned element stationary during the invariable extent of movement of the other element.

36. In a machine of the class described an enclosing cabinet provided with a plurality of lids, a common member for retaining all of said lids in closed position, means for operating said member to release all of said lids, and means for operating said member to release only one of said lids.

37. In a machine of the class described accounting mechanism comprising a plurality of sections, an enclosing cabinet having a plurality of lids each associated with one of said accounting sections, a common member for normally latching said lids, a lock controlled lever adapted to operate said member to simultaneously release all of said lids, and a separate lock adapted to operate said member to release a single lid.

38. In a machine of the class described, a plurality of oscillatory actuators, a plurality of type wheels constantly in mesh with said actuators, a plurality of totalizer wheels adapted to be meshed with said actuators on the forward stroke of the latter and a detent device for positively alining the type wheels at the end of the forward stroke of the actuators, whereby the actuators and totalizer wheels are also alined.

39. In a registering machine, a plurality of totalizers, actuators therefor, connections normally effective to engage a plurality of said totalizers with the actuators, a manipulative device for each totalizer and means whereby operation of the manipulative devices associated with one of said totalizers will render the engaging connections for another of said totalizers ineffective.

40. In a cash registering machine, a cabinet provided with a plurality of separate lids, latches normally preventing opening of the lids, a device adjustable to different positions to control functions of said machine, releasing mechanism whereby all of the latches will be disabled at one position of the adjustable device, and a supplemental device for releasing the latch of a single one of the lids.

41. In a cash registering machine a cabinet provided with a plurality of lids, latching devices for said lids, a lock controlled cam, a shaft extending across the machine oscillatable by the cam, said shaft being provided with means for effecting the release of said lids from said latching devices, and means for actuating the cam.

42. In an accounting machine the combination of a plurality of totalizers, an actuating mechanism therefor, means effective upon the initial operation of the machine for establishing a co-operative relation between said actuating mechanism and any one of said totalizers, a plurality of selecting levers associated, respectively, with said plurality of totalizers and adapted to produce the initial operation of the machine to pre-determine the totalizer to be actuated, the operation of one of said levers being a pre-requisite to the selection of any totalizer.

43. In a cash register the combination with amount keys, transaction keys, clerks' keys, a plurality of totalizers and actuating means therefor controlled by said amount keys, of means under the control of said clerks' keys normally effective to engage a selected totalizer with the actuators, and means controlled by the transaction keys effective to modify the operation of the first named means and prevent the engagement of a totalizer with the actuators.

44. In a registering machine, a transversely extending supporting shaft, a plurality of counters having their axes parallel to said supporting shaft and substantially equidistant therefrom, and counter operating arms associated respectively with said counters pivoted on said shaft, and means for actuating said arms.

45. In a machine of the class described, in combination, a plurality of counters mounted in a detachable frame, a plurality of counter operating arms mounted on a common support, and detachable connections between said counter operating arms and said counters.

Signed at Bridgeport, county of Fairfield, State of Connecticut, 1918.

FREDERICK L. FULLER.